(12) United States Patent
Chen et al.

(10) Patent No.: US 12,183,901 B1
(45) Date of Patent: Dec. 31, 2024

(54) LOW-TEMPERATURE HYDROTHERMAL RELITHIATION OF SPENT LITHIUM-ION BATTERY CATHODES BY REDOX MEDIATION

(71) Applicant: THE REGENTS OF THE UNIVERSITY OF CALIFORNIA, Oakland, CA (US)

(72) Inventors: Zheng Chen, San Diego, CA (US); Xiaolu Yu, La Jolla, CA (US)

(73) Assignee: THE REGENTS OF THE UNIVERSITY OF CALIFORIA, Oakland, CA (US)

( * ) Notice: Subject to any disclaimer, the term of this patent is extended or adjusted under 35 U.S.C. 154(b) by 0 days.

(21) Appl. No.: 18/811,672

(22) Filed: Aug. 21, 2024

Related U.S. Application Data

(63) Continuation of application No. PCT/US2023/013733, filed on Feb. 23, 2023.

(60) Provisional application No. 63/313,677, filed on Feb. 24, 2022.

(51) Int. Cl.
*H01M 10/54* (2006.01)
*H01M 4/505* (2010.01)
*H01M 4/525* (2010.01)
*H01M 10/0525* (2010.01)

(52) U.S. Cl.
CPC ........... *H01M 10/54* (2013.01); *H01M 4/505* (2013.01); *H01M 4/525* (2013.01); *H01M 10/0525* (2013.01)

(58) Field of Classification Search
None
See application file for complete search history.

(56) References Cited

U.S. PATENT DOCUMENTS

| | | |
|---|---|---|
| 8,846,225 B2 | 9/2014 | Sloop |
| 9,287,552 B2 | 3/2016 | Sloop |
| 9,484,606 B1 | 11/2016 | Sloop et al. |
| 2016/0218365 A1 | 7/2016 | Yamamoto |
| 2017/0200989 A1 | 7/2017 | Sloop |
| 2017/0288209 A1 | 10/2017 | Liu |
| 2018/0309174 A1 | 10/2018 | Rodriguez et al. |
| 2021/0226273 A1 | 7/2021 | Park et al. |

(Continued)

FOREIGN PATENT DOCUMENTS

| | | |
|---|---|---|
| WO | 2019136397 A1 | 7/2019 |
| WO | 2020023912 A1 | 1/2020 |

(Continued)

OTHER PUBLICATIONS

P. Xu, Q. Dai, H. Gao, H. Liu, M. Zhang, M. Li, Y. Chen, K. An, Y. S. Meng, P. Liu, Y. Li, J. S. Spangenberger, L. Gaines, J. Lu, Z. Chen. Efficient Direct Recycling of Lithium-Ion Battery Cathodes by Targeted Healing, Joule 4, 2609-2626, Dec. 16, 2020.*

(Continued)

*Primary Examiner* — Carlos Barcena
(74) *Attorney, Agent, or Firm* — Eleanor Musick; Torrey Pines Law Group PC

(57) ABSTRACT

A process for low temperature hydrothermal relithiation of spent lithium-ion battery cathode materials adds a reducing agent to an aqueous Li solution at 80-100° C. followed by a short anneal to achieve complete recovery of composition, crystal structure, and electrochemical performance for heavily degraded cathode materials.

26 Claims, 16 Drawing Sheets

(56) References Cited

U.S. PATENT DOCUMENTS

| | | |
|---|---|---|
| 2021/0384525 A1 | 12/2021 | Kim |
| 2022/0013773 A1 | 1/2022 | Lee et al. |
| 2022/0029217 A1 | 1/2022 | Young et al. |
| 2022/0376312 A1 | 11/2022 | Chen et al. |

FOREIGN PATENT DOCUMENTS

| | | |
|---|---|---|
| WO | 2020185958 A1 | 9/2020 |
| WO | 2021119295 A1 | 6/2021 |
| WO | 2022076904 A1 | 4/2022 |
| WO | 2024123811 A1 | 6/2024 |

OTHER PUBLICATIONS

Gu, S., et al. "Regeneration of NCM622 from end-of-life lithium-ion batter cathode materials", RSC Advances, Royal Society of Chemistry, 2023, pp. 906-913 vol. 13.

International Search Report and Written Opinion of the ISA, PCT/US23/13733, Jun. 2, 2023, 8 pages.

Xu et al., Design and Optimization of the Direct Recycling of Spent Li-ion Battery Cathode Materials, ACS Sustainable Chem. Eng. Mar. 18, 2021, pp. 4543-4553.

\* cited by examiner

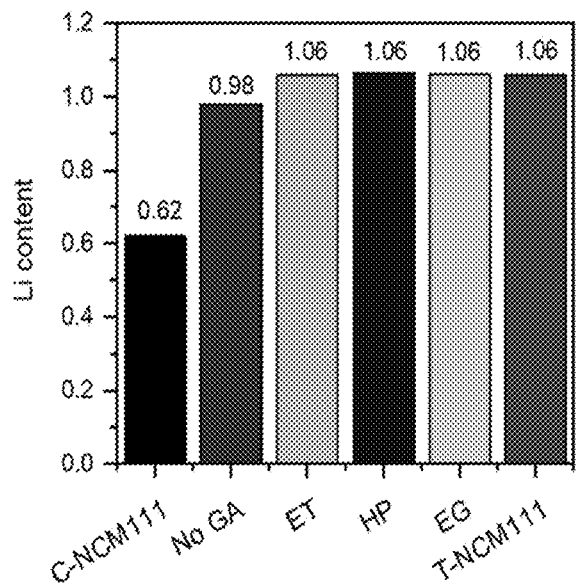
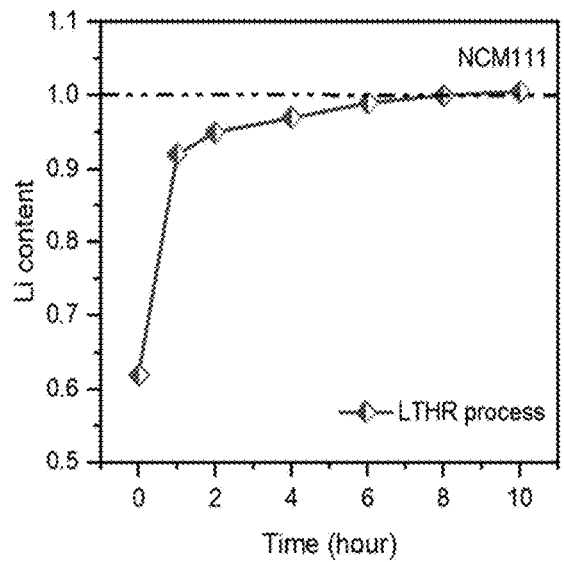
FIG. 4A
FIG. 4B
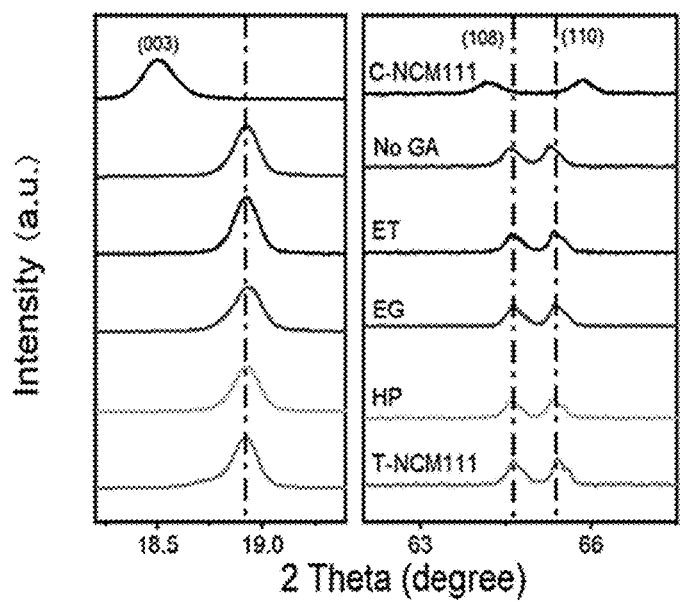
FIG. 4C

LOW-TEMPERATURE HYDROTHERMAL RELITHIATION OF SPENT LITHIUM-ION BATTERY CATHODES BY REDOX MEDIATION

RELATED APPLICATIONS

This is a continuation under 35 U.S.C. 365(c) of International Application No. PCT/US2023/013733, filed Feb. 23, 2023, which claims the benefit of the priority of U.S. Provisional Application No. 63/313,677, filed Feb. 24, 2022, which is incorporated herein by reference.

GOVERNMENT RIGHTS

This invention was made with government support under Grant No. DE-AC02-06CH11357(SUB 9F-60081) awarded by the Department of Energy, and Grant No. CBET1805570 awarded by the National Science Foundation. The government has certain rights in the invention.

FIELD OF THE INVENTION

The present invention relates to a safe and energy efficient direct regeneration process for lithium-ion battery cathodes.

BACKGROUND

Lithium-ion batteries (LIBs) are widely used power sources for portable electronic devices, recreational equipment, and electric vehicles (EVs) because of their high energy density and long cycle life. With an average lifespan of 5-10 years, a massive amount of LIBs will be retired in the next several years. It is estimated that about 1 million EV batteries will reach their end of life (EOL) by 2025, which may cause significant issues if they are not properly treated. The release of flammable and hazardous wastes (such as electrolyte and transition metals) resulting from inappropriate disposal of spent LIBs can contaminate soil, water and air. Consequently, the development of effective and environment-friendly LIB recycling strategies has become an urgent need not only to reduce the environmental impact of LIB waste but also to recover valuable resources such as lithium (Li) and cobalt (Co) and nickel (Ni).

Recently, recycling of LIB cathodes has gained significant interest due to the high value of Co, Ni and Li. Existing approaches employ three primary recycling methods: pyrometallurgical, hydrometallurgical, and direct recycling. The pyrometallurgical process is based on a high-temperature smelting process which often involves burning mixed LIB materials followed by chemical separation. This process features low operational complexity and ease of scaling up development but has relatively low recovery efficiency. Aqueous chemistry is generally employed in the hydrometallurgical process, which involves leaching in acids followed by precipitation, chemical separation, and purification. While pyrometallurgical and hydrometallurgical processes represent the state-of-the-art technologies in the recycling industry, the involvement of high-temperature smelting and extensive usage of acid and base chemicals raises concerns about large scale energy consumption (and high operational costs) and secondary pollution, respectively. Combination of pyrometallurgy and hydrometallurgy recycling approaches has provided some benefit in terms of reducing the energy and reagent cost while increasing recovery efficiency. A recent advancement in pyrometallurgy is the closed-loop "hydro-to-cathode" approach, which eliminates the complicated chemical separation of Ni, Co, and Mn, offering battery recovering efficiency and lower operational cost. Nonetheless, these methods require complete breakdown of cathode particles (e.g., NCM) to their elemental products (e.g., $CoSO_4$, $NiSO_4$, $Li_2CO_3$), which wastes the significant amount of embedded energy in the cathode particle structures. In contrast, the direct recycling method involves a physical separation process to harvest cathode and anode materials with mild post treatment to repair the compositional and structural defects of the electrode particles, simultaneously retaining their original compound structures and the embedded energy. In this regard, direct recycling appears to offer the greatest potential for maximizing the value recovered from LIBs.

In recent years, direct LIB cathode regeneration based on hydrothermal relithiation followed by a short post annealing step has been reported by a number of researchers in the field, demonstrating effective reconstruction of the morphology, composition, and crystal structure of spent $LiCoO_2$ (LCO), $LiNi_{0.33}Co_{0.33}Mn_{0.33}O_2$ (NCM111), $LiNi_{0.5}Co_{0.2}Mn_{0.3}O_2$ (NCM523), $LiNi_{0.6}Co_{0.2}Mn_{0.2}O_2$ (NCM622) and $LiFePO_4$ (LFP) cathodes, leading to the same level of electrochemical performance as their pristine materials. See, e.g., E. Gratz, et al., "A closed loop process for recycling spent lithium ion batteries", *Journal of Power Sources* 262 (2014) 255-262; Y. Shi, et al., "Ambient-Pressure Relithiation of Degraded $Li_xNi_{0.5}Co_{0.2}Mn_{0.3}O_2$ ($0<x<1$) via Eutectic Solutions for Direct Regeneration of Lithium-Ion Battery Cathodes", *Adv. Energy Mater.* 9 (2019) 1900454; S. Sloop, et al., "A direct recycling case study from a lithium-ion battery recall", *Sustainable Materials and Technologies* 25 (2020) e00152; L. Bruckner, et al., "Industrial Recycling of Lithium-Ion Batteries—A Critical Review of Metallurgical Process Routes", *Metals* 10 (2020) 1107; Y. Shi, et al., "Effective regeneration of $LiCoO_2$ from spent lithium-ion batteries: A direct approach towards high-performance active particles", *Green Chem.* 20 (2018) 851-862; and P. Xu, et al., "Efficient Direct Recycling of Lithium-Ion Battery Cathodes by Targeted Healing", *Joule* 4 (2020) 2609-2626. Described methods feature simple operation and low energy consumption, taking advantage of the hydrothermal relithiation process to recover the cathode compositions without being concerned with variation of Li loss in different feedstocks of degraded LIBs. The processes also leverage the short sintering process to recover the cathode microstructure with desirable stoichiometry and crystallinity. However, a hydrothermal relithiation temperature of greater than 200° C. (e.g., 220° C.) is generally required for full recovery of the Li deficiencies to achieve good electrochemical properties. Such an aqueous relithiation process raises potential safety concerns for large-scale operation due to the high vapor pressure (e.g., 25 bar at 220° C.) within the relithiation reactor. Accordingly, the need remains for a safe and energy efficient hydrothermal relithiation process for efficient direct recycling of LIBs.

SUMMARY

The inventive approach provides a safe and energy efficient direct regeneration process based on low-temperature hydrothermal relithiation (LTHR) at ambient pressure for spent $LiNi_xCo_yMn_zO_2$ ($0<x, y, z<1$, $x+y+z=1$, or NCM) cathode materials. A low concentration of low-cost redox mediator is employed to improve the relithiation kinetics of spent NCM materials, enabling full relithiation temperature to be reduced from 220° C. to 100° C. or lower. The pressure incurred in the relithiation process can be reduced from −25 bar to 1 bar, significantly improving operational safety.

Effectiveness of the improved method has been demonstrated on different NCM materials, including chemically delithiated NCM111, cycled (degraded) NCM111, and cycled NCM622, which were successfully regenerated with complete recovery of composition, crystal structure, and electrochemical performance, achieving the same effectiveness as that achieved at high temperature process.

The inventive approach provides a versatile low-temperature hydrothermal relithiation (LTHR) process to recover the Li composition of degraded NCM cathode materials efficiently and safely at ambient pressure. An important aspect of the inventive process is the use of a class of reducing agents as green additives (GAs) in the aqueous relithiation solution (LiOH solution) with low concentration (1%-3% v/v). These additives allow the hydrothermal relithiation temperature to be reduced, with a corresponding reduction in processing pressure. This inventive LTHR process exhibits the same effectiveness in relithiation as can be achieved at high temperature process, leading to complete regeneration of chemically delithiated NCM111, cycled NCM111 and cycled NCM622. This LTHR process can pave the way to more sustainable LIB recycling with high economic return, high operational safety, and lower cost.

In one aspect of the invention, a method for regenerating spent lithium-ion battery cathode material, where the cathode material is in a powdered form, includes: processing the cathode material in an aqueous lithium (Li) solution and a reducing agent at a temperature within a range of 80° to 100° C. for a processing period; washing and drying the processed cathode material; annealing the dried processed cathode material in oxygen at an annealing temperature for an annealing period to produce regenerated cathode material. In some embodiments, the Li solution is LiOH, and the solution may be 0.1 to 4 M LiOH with 1-3% (v/v) of the reducing agent. The reducing agent is preferably a green reducing additive, which may be one or a combination of ethanol (ET), ethylene glycol (EG) and hydrogen peroxide (HP). The processing period may be from 2 to 20 hours, more preferably 6 to 12 hours, and most preferably, 8 hours. The annealing temperature may be within a range of 600 to 1000° C. and the annealing period is from 1 to 10 hours, and more preferably, may be 850° C. where the annealing period is four hours. The cathode material may be $LiNi_xCo_yMn_zO_2$, where $0<x$, y, $z<1$, $x+y+z=1$ ("NCM"), which may be $LiNi_{0.33}Co_{0.33}Mn_{0.33}O_2$ (NCM111) or $LiNi_{0.6}Co_{0.2}Mn_{0.2}O_2$ (NCM622). In some embodiments, before annealing, 5 mol % of excessive $Li_2CO_3$ may be mixed with the processed cathode material.

In another aspect of the invention, a method for treating lithium-ion battery cathode material from a spent battery cell, includes separating cathode strips from the battery cell; treating the cathode strips in one or more solvent solutions to remove NCM, binder and carbon black from cathode strip substrates and extract NCM powder; processing the NCM powder in an aqueous lithium (Li) solution and a reducing agent at a temperature within a range of 80° to 100° C. for a processing period to relithiate the NCM powder; washing and drying the relithiated powder; and annealing the dried powder in oxygen at an annealing temperature for an annealing period to produce a cathode powder with restored composition, crystal structure and electrochemical performance. The method may further include, before annealing, mixing 5 mol % of excessive $Li_2CO_3$ with the relithiated powder. In some embodiments, the Li solution is LiOH, and the solution may be 0.1 to 4 M LiOH with 1-3% (v/v) of the reducing agent. The reducing agent is preferably a green reducing additive, which may be one or a combination of ethanol (ET), ethylene glycol (EG) and hydrogen peroxide (HP). The processing period may be from 2 to 20 hours, and more preferably 6 to 12 hours. The annealing temperature may be within a range of 600 to 1000° C. and the annealing period is from 1 to 10 hours, and more particularly, may be 850° C. where the annealing period is four hours. The cathode material may be $LiNi_xCo_yMn_zO_2$, where $0<x$, y, $z<1$, $x+y+z=1$ ("NCM"), which may be $LiNi_{0.33}Co_{0.33}Mn_{0.33}O_2$ (NCM111) or $LiNi_{0.6}Co_{0.2}Mn_{0.2}O_2$ (NCM622).

BRIEF DESCRIPTION OF THE DRAWINGS

FIG. 1A is a schematic illustration of hydrothermal relithiation-based direct regeneration process of degraded NCM materials; FIG. 1B illustrates the role of GAs in the inventive LTHR process; and FIG. 1C compares saturation vapor pressure of water at temperatures associated with different reactor processing conditions.

FIGS. 4A-4F illustrate relithiation kinetics, where FIG. 4A compares Li content in different NCM111 particles with and without relithiation obtained by ICP results; FIG. 4B plots composition evolution of cycled NCM111 during relithiation via LTHR process;

FIG. 4C plots XRD patterns of cathode samples relithiated at 100° C. with three different GAs (ET, EG and HP) as well as control samples (T-NCM111); FIG. 4D plots unit cell parameters of a and c of different NCM111 samples; FIGS. 4E and 4F are XRD patterns of samples relithiated at 100° C. and control samples (T-NCM111 and D-NCM111), respectively.

FIG. 5A (panel a) cycled NCM111, (panel b) T-NCM111, (panel c) relithiated without green additives, (panel d) with hydrogen peroxide, (panel e) with ethanol and (panel f) with ethylene glycol at 100° C. Scale bar in each panel is 10 µm; FIG. 5B (panel a) cycled NCM111, (panel b) T-NCM111, (panel c) relithiated without green additives, (panel d) with hydrogen peroxide, (panel e) with ethanol and (panel f) with ethylene glycol at 100° C. Scale bar in each panel is 4 µm.

FIG. 6A shows C-NCM111, FIG. 6B shows T-NCM111, and FIGS. 6C and 6D show relithiated C-NCM111, respectively, without GA and with GA at 100° C.

FIGS. 7A and 7B are voltage profiles and cycling stability, respectively, of regenerated NCM111 samples using different GAs at 100° C. and their comparison with the pristine and non-treated C-NCM111; FIGS. 7C and 7G plot cycling stability for pristine and regenerated NCM111; FIGS. 7D and 7E are voltage profiles and cycling stability, respectively, of regenerated, non-treated, and pristine NCM622 samples; FIGS. 7F and 7H plot cycling stability for pristine and regenerated NCM622.

DETAILED DESCRIPTION OF EMBODIMENTS

Figure 1A:
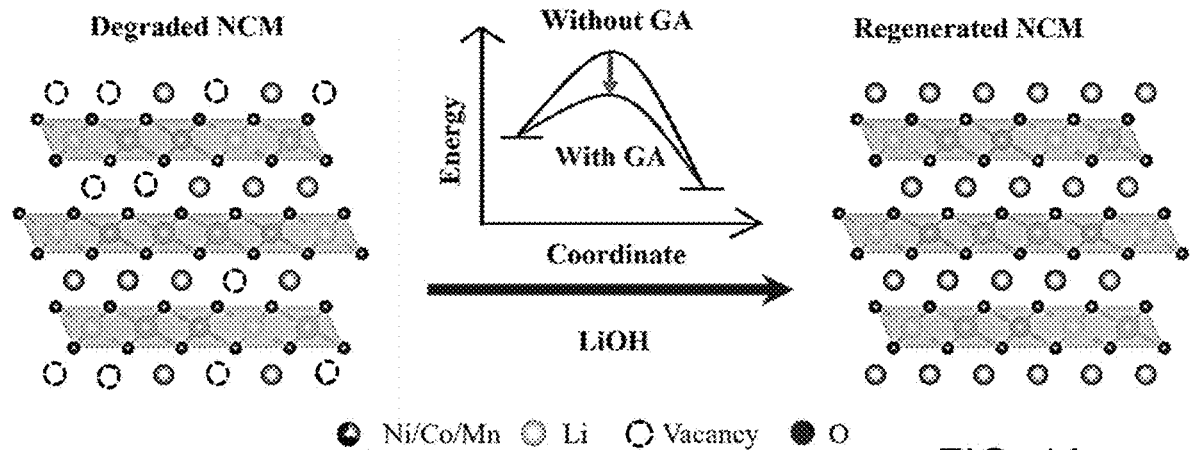
FIGS. 1A-1C provide an overview of relithiation processing of degraded NCM111 according to an embodiment of the inventive method, where
Figure 1B:
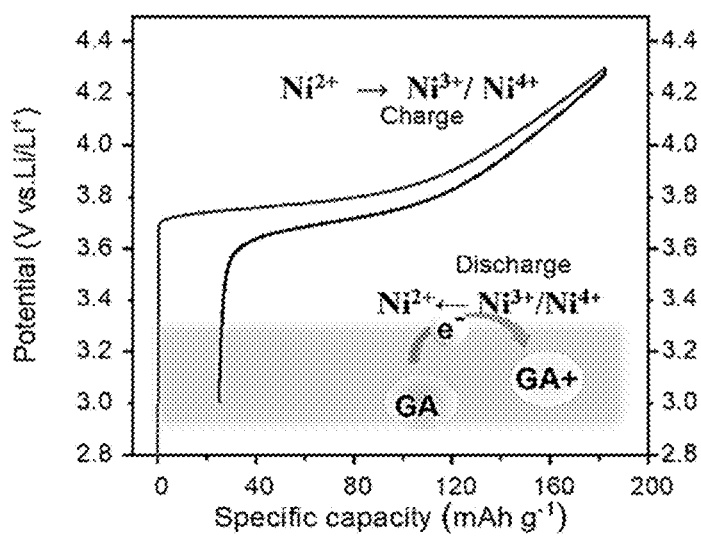
Figure 1C:
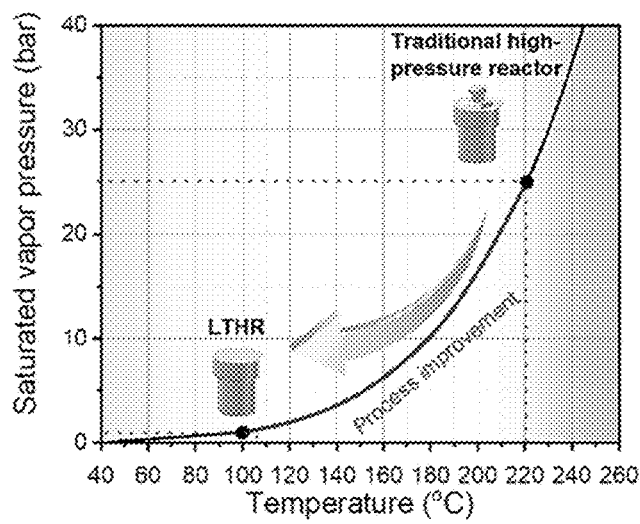
Figure 3:
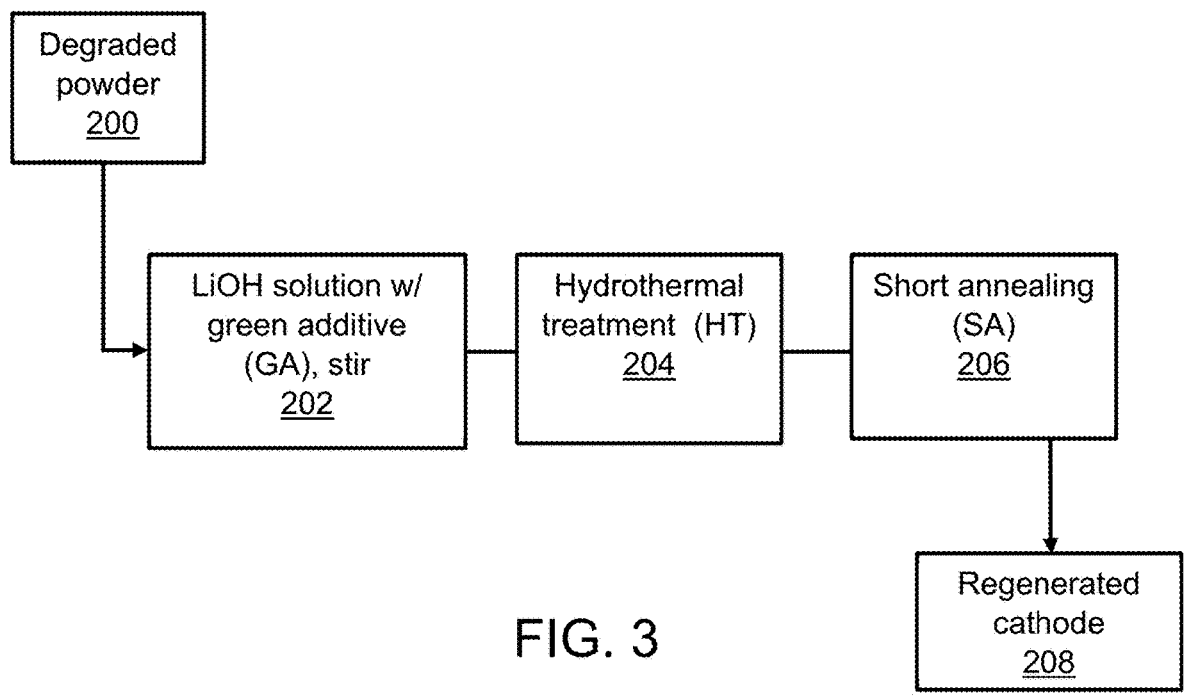
FIG. 3 is a flow diagram showing the process for direct recycling of a LIB according to an embodiment of the invention.

FIGS. 1A-1C provide an overview of the LTHR relithiation process according to the inventive scheme. A simple flow diagram of the process is shown in FIG. 3. According to the inventive LTHR process by redox mediation for direct recycling, the degraded NCM111 particles 200 are treated via relithiation in LiOH solution with the addition of different reducing agents (step 202). To meet an important objective of the inventive process, specifically that of reducing/eliminating the need for environmentally unfriendly materials, the reducing agents employed were green additives, or "GAs". In the inventive process, the key to regenerate the degraded NCM111 effectively at low temperature is to reduce the $Ni^{3+}$ ions in the degraded NCM111 into $Ni^{2+}$ ions and to compensate the Li deficiency in the structure for charge balance. The inventive approach employs a reductive environment to help lower the activation barrier, which can facilitate $Ni^{3+}$ reduction (FIG. 1A). The solution treatment method with the reducing agents to promote the redox reaction, in which $Ni^{3+}$ ions in the crystal can be more easily reduced due to the donation of electrons from the reducing agents. Consequently, the facile reduction of $Ni^{3+}$ promotes the insertion of $Li^+$ from the solution into the cathode material, sharing the same essence of electrochemical $Li^+$ insertion (FIG. 1B). Three different GAs (ethanol, hydrogen peroxide and ethylene glycol) were considered to verify this mechanism, however, as will be recognized by those of skill in the art, additional GAs are known and may be used to provide the desired redox properties, including, but not limited to, glycerol, citric acid, L-ascorbic acid, and other known green reducers. Further, combinations of the GAs may also be used. Of the three GAs discussed herein, the standard reduction potentials are −0.77 V (ethanol, versus standard hydrogen electrode or SHE), 0.15 V (hydrogen peroxide), and −0.72 V (ethylene glycol), respectively, which are all below the $Ni^{3+}/Ni^{2+}$ redox potential (~0.7 V). The Gibbs free energies, $\Delta G=-nFE=-nF(0.7-E_{GA})$, of the reaction between NMC materials and GAs are negative, which indicates the relithiation of degraded NCM materials with GAs are thermodynamically favorable. To detect the oxidized products of the three reducing agents in LiOH solution after hydrothermal process, NMR spectra were measured, which showed that the oxidized products of ethanol, hydrogen peroxide and ethylene glycol in LiOH solution are lithium acetate, oxygen, and lithium oxalate, respectively, with the following reactions occurring:

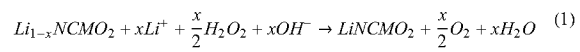
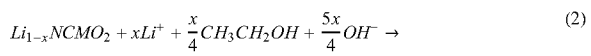
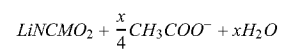
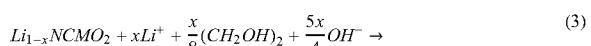
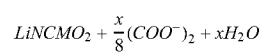

The reducing additives thus allow the relithiation to proceed at a relatively low temperature and pressure due to improved redox kinetics, lowering the energy costs, and improving the operating safety (FIG. 1C). Although all three GAs could assist to regenerate NMCs, ethylene glycol (EG) was deemed most suitable for practical application due to its relatively low cost and safety considerations (high flash point and boiling point). While further evaluation included all three GA candidates, EG was primarily employed as a reducing agent to study the mechanism of LTHR process.

To further evaluate the effectiveness of the inventive LTHR method, two types of degraded NCM111 particles were initially used to study the impact of redox mediation. One is the D-NCM111 with 10% of Li loss, which is the model material from the ReCell project, and the other one is the C-NCM111 from a Honda Clarity EV. Initial screening of GAs was conducted using D-NCM11 and then systematic kinetics study was performed on C-NCM111. Specifically, C-NCM111 was subjected to relithiation in a 4 M LiOH solution at 100° C. for 8 hours with assistance of three different GAs, including ethanol (ET), ethylene glycol (EG) and hydrogen peroxide (HP) followed by short annealing at 850° C. As a further validation of the crucial role of reducing agent, the C-NCM111 was treated with a LiOH solution without the reducing agent under the same conditions.

Chemically delithiated NCM111 with ~10% of Li loss, denoted as "D-NCM111", was made by the Materials Engineering Research Facility (MERF) at Argonne National Laboratory. Briefly, pristine NCM111 (provided by Toda America Inc.) was reacted with an aqueous solution of potassium persulfate to leach Li out. Afterwards, the leached material was washed by water, then acetonitrile, and finally dried under vacuum at the ambient condition. This delithiated NCM111 was utilized as our starting material for additive screening and was manufactured at 1 kg per batch size.

Figure 2:
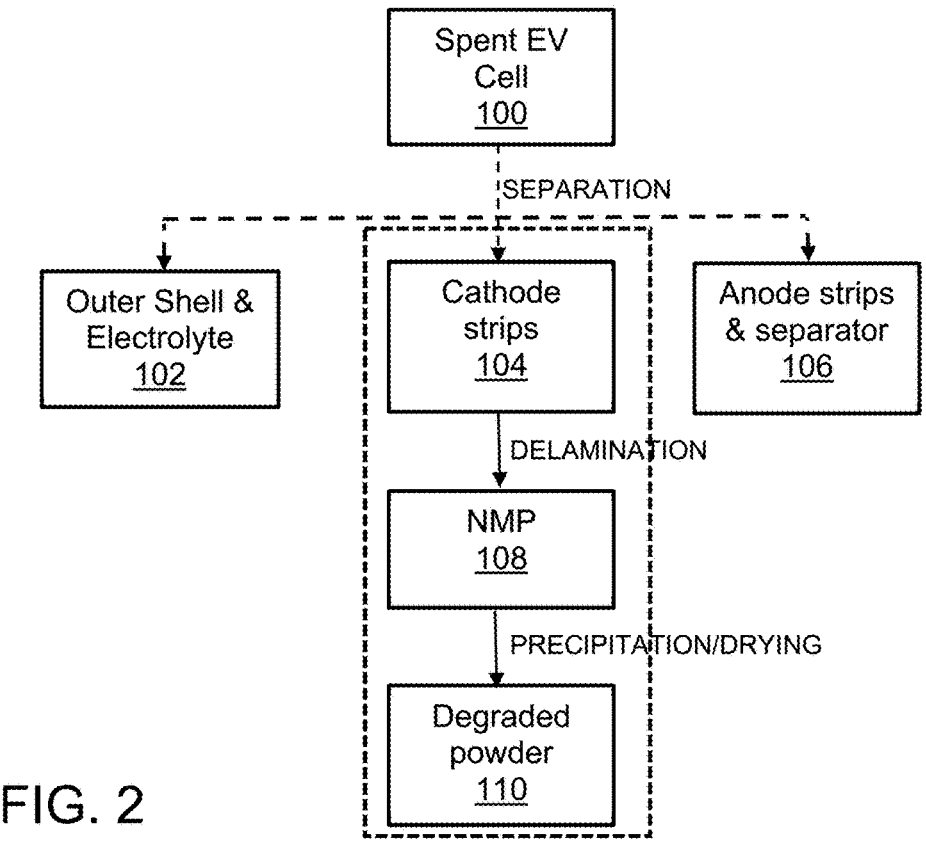
FIG. 2 is a flow diagram showing the process for an exemplary material harvesting process for recycling a spent LIB.

Referring to FIG. 2, the process flow used to obtain the degraded material for evaluation of the inventive process is shown. Starting at step 100, commercial NCM111 cells (20 Ah) were disassembled from a HONDA® Clarity Hybrid EV and separated into three primary components: outer shell and electrolyte (step 102), cathode strips (step 104) and anode strips and separator (step 106). To harvest this electrochemically cycled NCM111 material (denoted as "C-NCM111"), the cathode strips from step 104 are rinsed with dimethyl carbonate (DMC) to eliminate the remaining electrolyte. After drying, the cathode strips were soaked in N-Methyl-2-pyrrolidone (NMP) (step 108), then sonicated for 20 minutes to remove the NCM powders, binder, and carbon black (CB) from the aluminum substrates. The obtained solution was centrifuged for 5 minutes at 3,500 rpm to extract the C-NCM111 powders. The precipitation was rinsed by multiple times with NMP before being collected and dried for the regeneration experiment. CB has a considerably lower density than NCM111 and could be separated during the precipitation process by gravity. Electrochemically cycled NCM622 (C-NCM622) with significant capacity degradation, also from Argonne National Laboratory, was separated using a similar approach.

Referring again to FIG. 3, the degraded cathode powder 200 (chemically delithiated NCM111, and electrochemically degraded NCM111 and NCM622) was stirred in a LiOH aqueous solution (step 202) with addition of a 1-3% (v/v) of a reducing agent, specifically a green additive (GA), and treated at 80°–100° C. (step 204) for from 2 to 20 hours ("processing period") for relithiation. The LiOH solution may have a concentration within the range of 0.1-4M. In most testing, a 4M LiOH concentration, a temperature of 100° C., and an 8 hour processing period were used. This step was followed by washing with deionized water to remove Li salt residues. After drying, the relithiated powders were mixed with 5 mol % of excessive $Li_2CO_3$ (to compensate for Li loss during the post-annealing process) and subjected to a "short anneal". (As is known in the art, a "short anneal" is distinguishable from a "full anneal" in terms of conditions and the resulting material changes.) The annealing parameters used in most evaluation processes were 850° C. for 4 hours in oxygen with a ramping rate of 5° C. $min^{-1}$ (step 206) to produce regenerated cathode material (step 208). Overall, the "short anneal" conditions used within the inventive process may vary within a range of 1 to 10 hours at a temperature of around 600 to 1,000° C. It is noted that transition metal leaching may occur during prolonged cycling, especially in harsh conditions for spent cathodes. The extent of leaching is affected by cycling conditions (temperature, upper cutoff voltage, etc.), microstructures of cathodes, cathode material types (especially Mn-rich), and so on. However, transition metal leaching is not considered a significant issue in the present case for NCMs. Based on the ICP results, no obvious transition metal composition changes and dissolution of transition metal ions was found in the spent NCMs compared with comparable pristine materials. The leaching amount for transition metal was minimal.

The chemical composition of various cathode powders was evaluated by inductively coupled plasma mass spectrometry (ICP-MS, Thermo Scientific, iCAP RQ model). The surface composition of the samples was analyzed by X-ray photoelectron spectroscopy (XPS). PHI 5000 VersaProbe II system (Physical Electronics) with Al Kα radiation (1486.6 eV) was used to collect the XPS data. X-ray powder diffraction (XRD) utilizing Cu Kα radiation (λ=1.5406 Å, Bruker D2 Phaser) was used to determine the crystal structure. General Structure Analysis System (GSAS) software with the EXPGUI interface was used to perform Rietveld refinement against XRD results. Scanning electron microscope (SEM, FEI XL30) was used to examine the surface structure and morphology of various cathode particles.

The electrochemical performance of all samples was assessed by coin cells (half-cell) with cathode mass loading of ~10 mg $cm^{-2}$. To prepare slurries of electrodes, the pristine, degraded, or regenerated NCM cathode material was mixed with conductive agent (Super P65), and polyvinylidene fluoride (PVDF) binder in a mass ratio of 8:1:1 in N-methyl-2-pyrrolidone (NMP) solvent. Afterwards, the slurries were casted onto aluminum foil with a doctor blade before drying at 120° C. for 12 h in a vacuum oven. The dry laminate was cut in disc-shape and calendared. Coin cells were fabricated inside a glovebox with a Li metal disc (thickness 1.1 mm) as the counter electrode, LP40 (1M $LiPF_6$ in ethylene carbonate/diethyl carbonate=50:50 (v/v)) or Gen2 (1.2M $LiPF_6$ in EC/EMC=3:7) as the electrolyte, and a tri-layer membrane (Celgard 2320) as the separator. Galvanostatic charge-discharge was tested using a Neware battery cycler in the potential range of 3.0-4.3 V with 4 activation cycles at the rate of C/10 followed by 50 cycles at a constant rate of C/3.

Figure 4D:
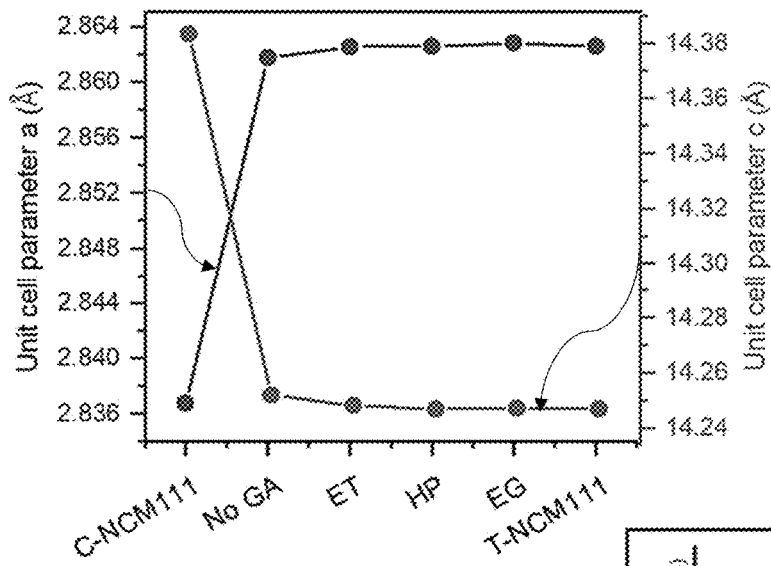

FIGS. 4A-4F illustrate relithiation kinetics according to the inventive approach. As shown by the ICP-MS results in FIG. 4A, the Li content ($x_{Li}$) of C-NCM111 ($x_{Li}$=0.62) was successfully recovered after the regeneration process with GAs at 100° C. ($x_{Li}$=1.06), which maintained the same stoichiometry as T-NCM111 ($x_{Li}$=1.06). Each of the three GAs (ET, HP and EG) exhibited nearly the same effect on the composition recovery. In contrast, the Li content can only achieve 0.98 under the same condition in the absence of GA. This effect was also observed in the D-NCM111 case, where the Li content recovered from 0.9 to 1.06 with GAs (See Table 1 below). Furthermore, we evaluated the relithiation kinetics for composition recovery of LTHR process (FIG. 4B). With assistance of the GA, an 8 h-LTHR process at 100° C. is able to achieve that same 100% composition recovery as does the traditional 220° C. process (see, e.g., FIG. 1C).

The morphology of the regenerated samples as well as the control sample was further compared. The LTHR process exhibited no influence on the particle morphology (FIGS. 5A-5B), which may be attributed to the mild regeneration conditions. XRD results also confirm the effectiveness of the LTHR process on the crystal structure recovery of the C-NCM111 and D-NCM111 samples (FIGS. 4C-4F). Overall, the diffraction peaks of all the samples matched well with the typical α-NaFeO$_2$ structure with the R$\bar{3}$m space group, indicating that the bulk structure of the NCM111 was not affected by electrochemical cycling (C-NCM111), chemical delithiation (D-NCM111) and our regeneration strategy, which again demonstrated the viability of the LTHR-based direct regeneration process.

Figure 4E:
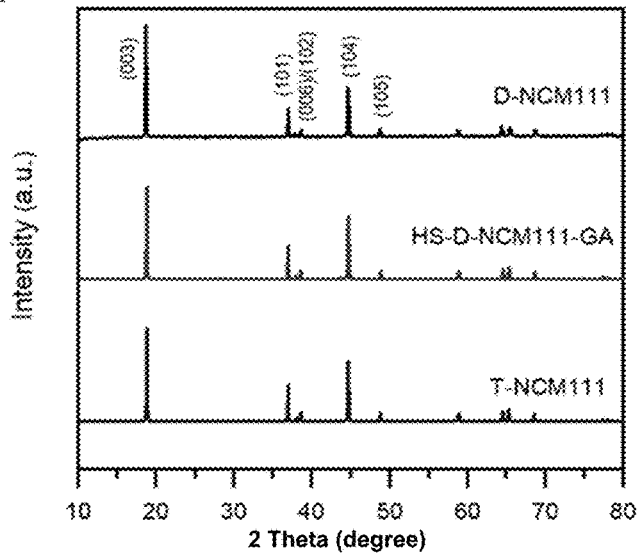
Figure 4F:
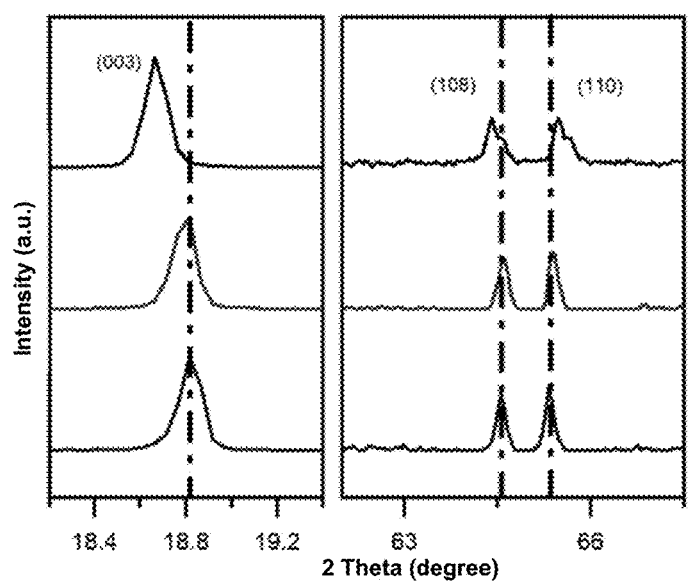
Figure 5A:
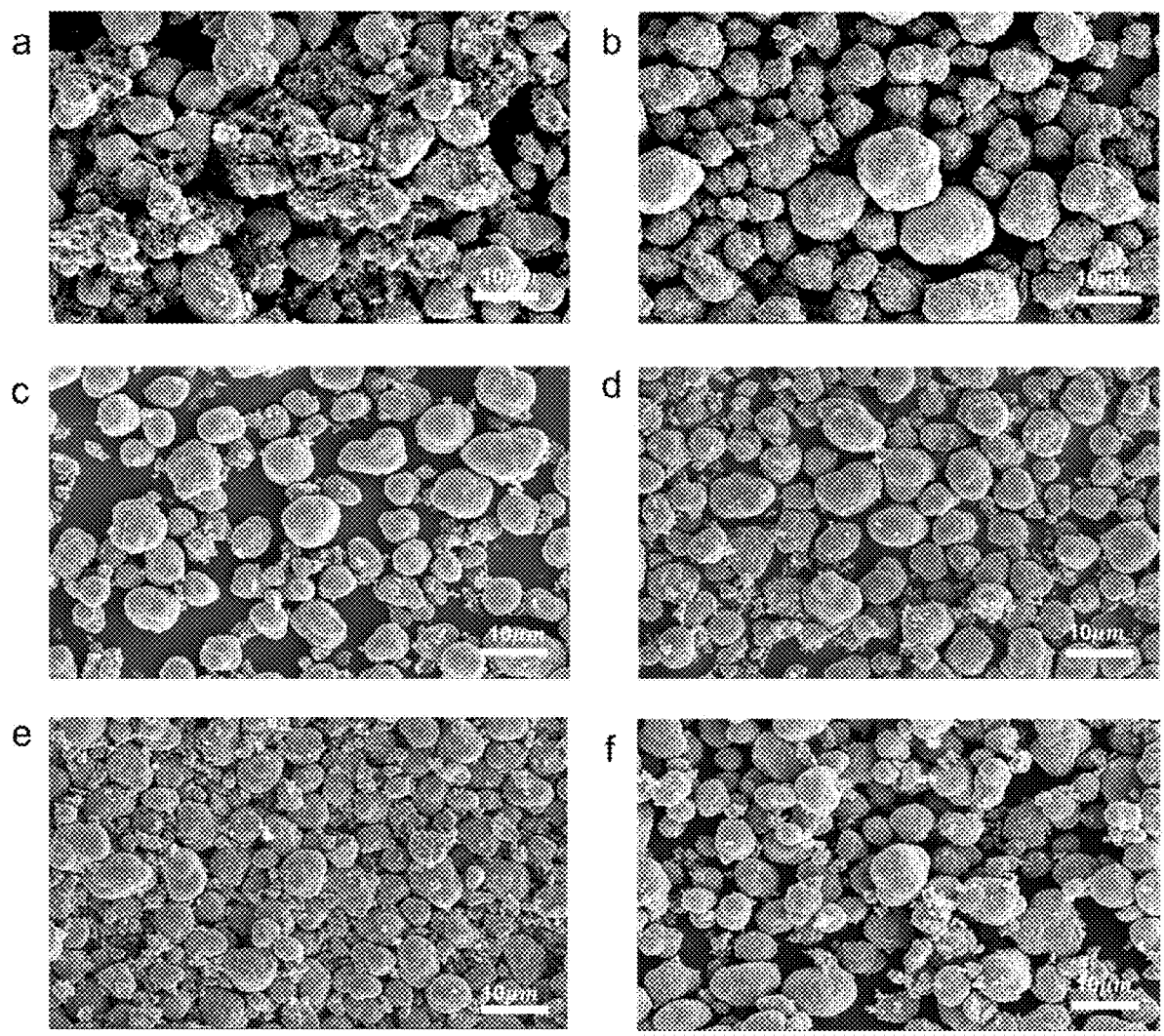
FIGS. 5A and 5B are SEM images of different samples.
Figure 5B:
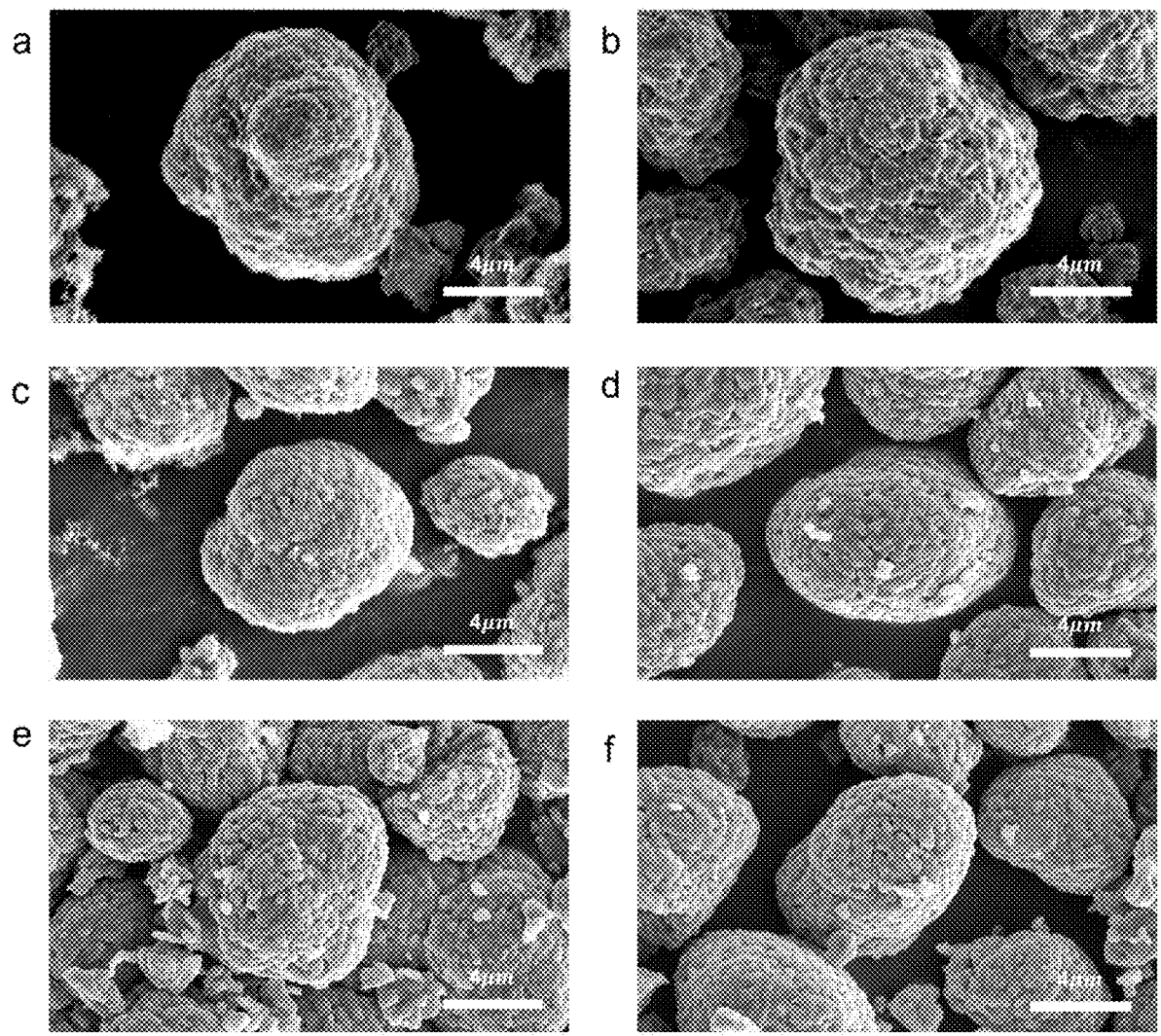

Microstructure evolution was observed clearly during the entire regeneration process. C-NCM111 exhibits a (003) peak shift to a lower degree (FIG. 4D), which can be explained by the increased electrostatic repulsion between the oxygen layers along the c direction when $Li^+$ is deficient. Meanwhile, the spacing between the peaks in the (108)/(110) doublets increases, indicating the decrease in a lattice parameters due to the decrease in average metal-metal distance caused by smaller effective ionic radii of $Ni^{3+}$ compared with $Ni^{2+}$. Similar peak shifting can be also observed in D-NCM111 (FIGS. 4E-4F). The lattice parameters of a and c unit cell were determined via Rietveld refinement and are listed in Table 1.

TABLE 1

| Sample | Composition | a/Å | c/Å | Li/Ni mixing/% | $R_{wp}$/% |
|---|---|---|---|---|---|
| C-NCM111 | $Li_{0.62}Ni_{0.34}Co_{0.33}Mn_{0.33}O_2$ | 2.837 | 14.383 | 5.47 | 1.795 |
| HS-No GA | $Li_{0.98}Ni_{0.34}Co_{0.33}Mn_{0.33}O_2$ | 2.862 | 14.252 | 2.45 | 1.650 |
| HS-ET | $Li_{1.06}Ni_{0.34}Co_{0.33}Mn_{0.33}O_2$ | 2.863 | 14.248 | 2.40 | 1.825 |
| HS-HP | $Li_{1.06}Ni_{0.34}Co_{0.33}Mn_{0.33}O_2$ | 2.863 | 14.247 | 2.43 | 1.923 |
| HS-EG | $Li_{1.06}Ni_{0.34}Co_{0.33}Mn_{0.33}O_2$ | 2.863 | 14.247 | 2.41 | 1.877 |
| D-NCM111 | $Li_{0.9}Ni_{0.34}Co_{0.33}Mn_{0.33}O_2$ | 2.848 | 14.311 | 3.92 | 1.925 |
| HS-GA | $Li_{1.07}Ni_{0.34}Co_{0.33}Mn_{0.33}O_2$ | 2.861 | 14.243 | 2.41 | 1.950 |
| T-NCM111 | $Li_{1.06}Ni_{0.34}Co_{0.33}Mn_{0.33}O_2$ | 2.860 | 14.247 | 2.39 | 1.930 |

The a lattice parameter decreased from 2.860 Å (T-NCM111) to 2.837 Å (C-NCM111) and 2.848 Å (D-NCM111), respectively. The c lattice parameter increased from 14.247 Å (T-NCM111) to 14.383 Å (C-NCM111) and 14.311 Å (D-NCM111), respectively, which is consistent with the peak shift from the XRD results. After the LTHR process, the (003), (108), and (110) peaks obviously shifted back to the original position as in the pristine T-NCM111, indicating the recovery of the original microstructure (FIGS. 4D and 4F). The lattice parameters of the a and c of the regenerated samples were close to those of the T-NCM111, indicating that Li$^+$ ions reached their equilibrium state in the lattice structure despite the low relithiation temperature. Furthermore, the Li/Ni mixing ratio of C-NCM111 decreased from 5.47 to 2.40 (ET), 2.43 (HP), and 2.41 (EG), respectively (FIG. 4E), reaching the mixing ratio nearly the same as the pristine T-NCM111 (2.39). In contrast, the Li/Ni mixing ratio did not perfectly recover to the original condition without GA, which redemonstrates that GA is conducive to regenerating NCM111 in the LTHR process.

Figure 6A:
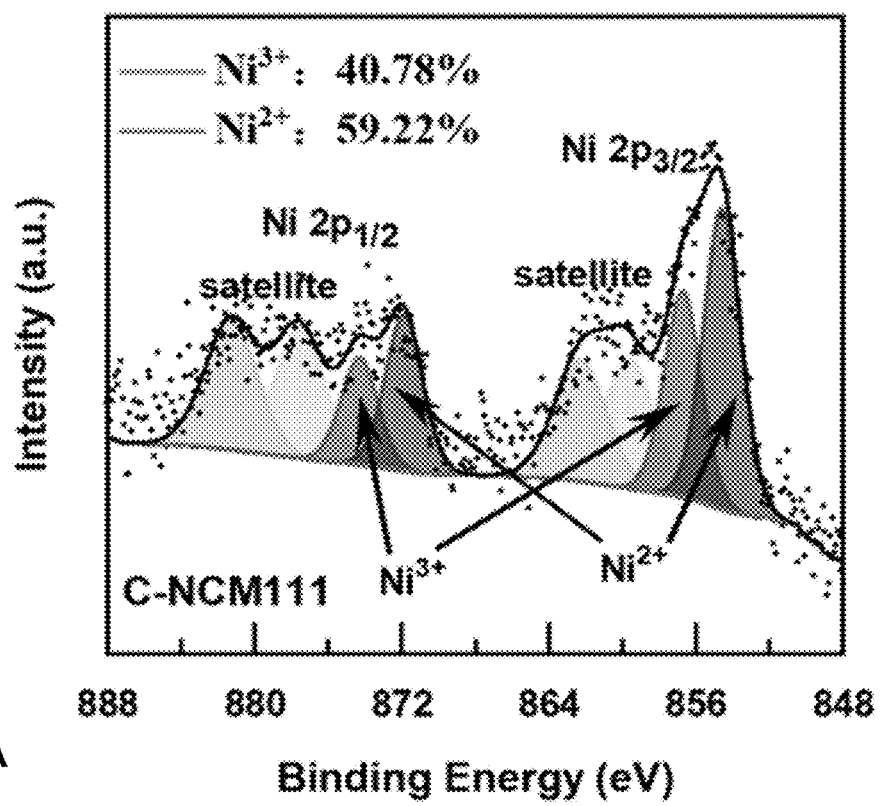
FIGS. 6A-6D are XPS spectra in Ni 2p region of different NCM111 samples, where
Figure 6B:
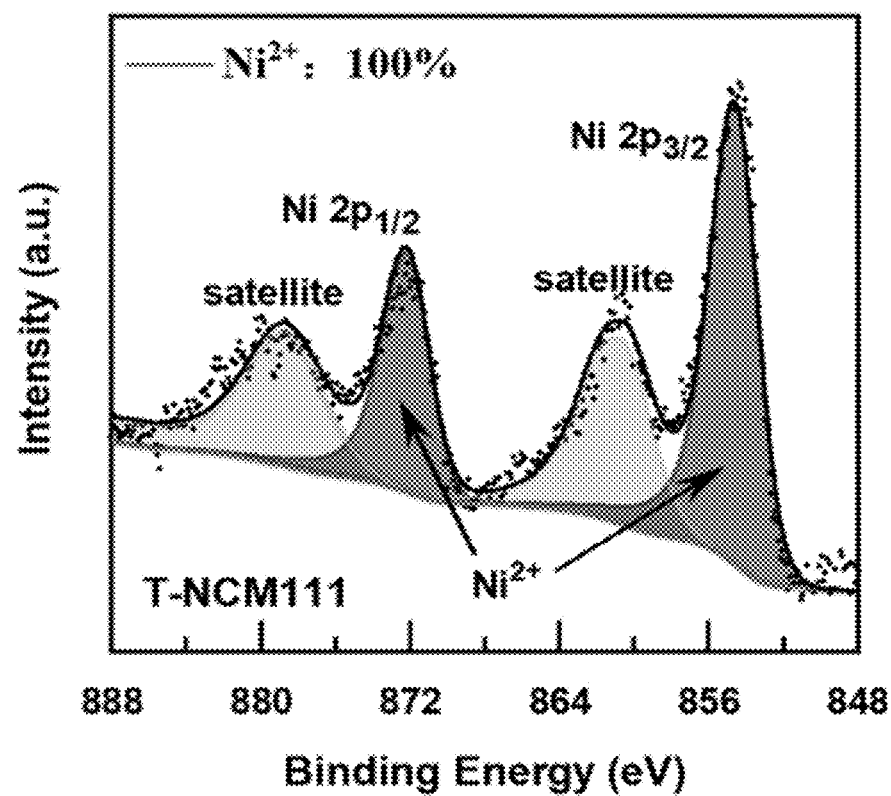
Figure 6C:
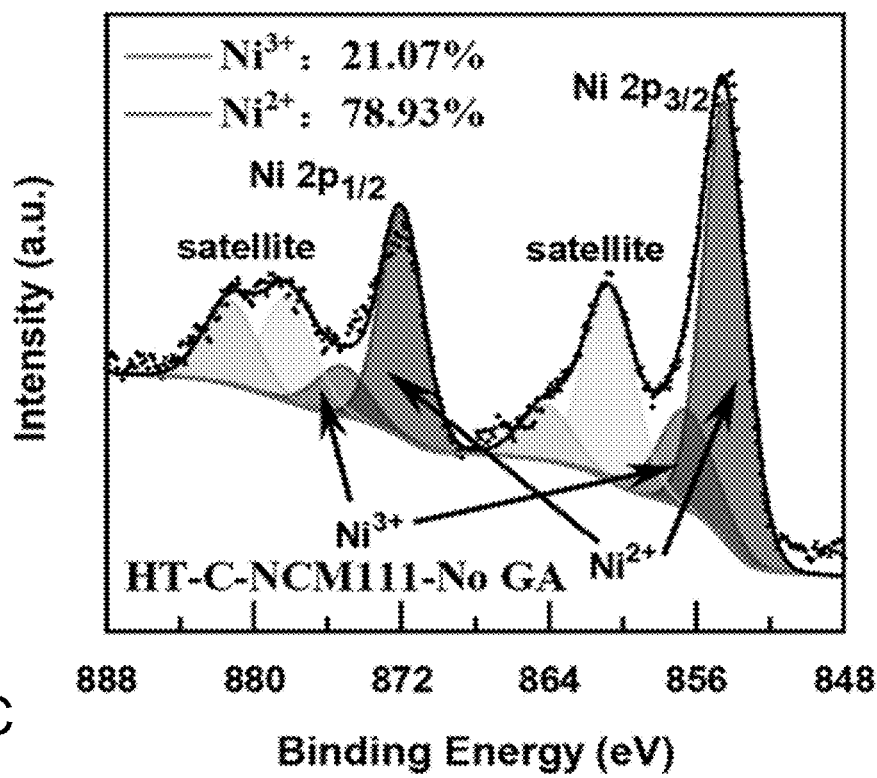
Figure 6D:
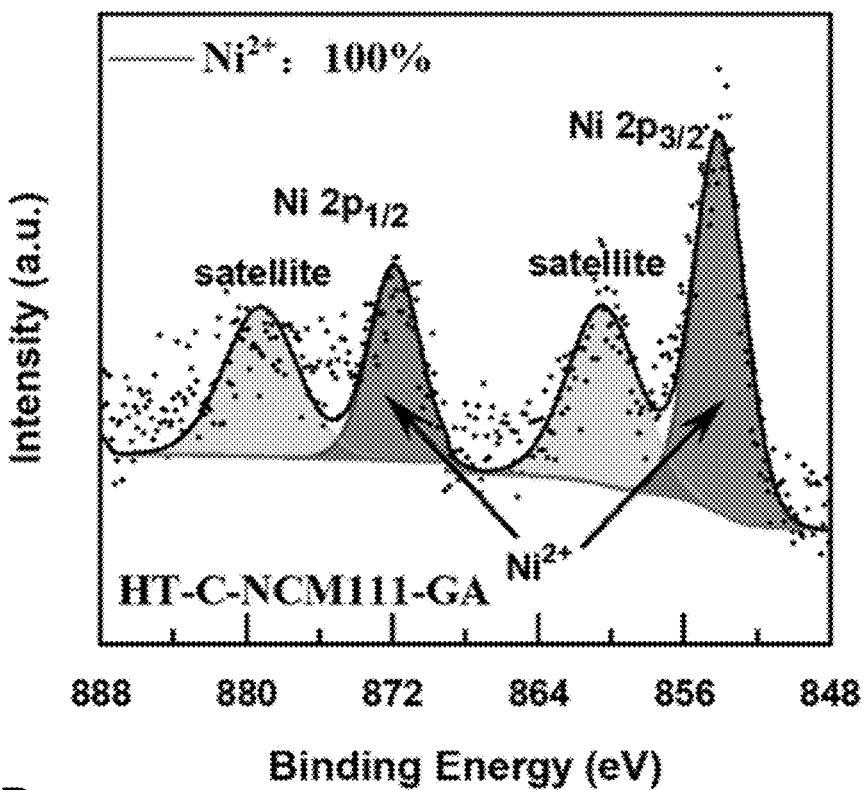

To further understand the role of GA in the LTHR process, XPS measurement was performed to determine the valence state of Ni in different NCM111 before annealing (FIGS. 6A-6D). Due to the lower redox voltage of Ni$^{3+}$/Ni$^{2+}$, only the variation of Ni valance status is expected to occur as the maximum Li deficiency is only 0.4 in this case, 40.78% of Ni was observed in the form of Ni$^{3+}$ in the C-NCM111 as shown in FIG. 6A. After relithiation in the LiOH-only solution (FIG. 6C), ~21.07% of Ni remained at Ni$^{3+}$ compared to the nearly 100% of Ni$^{3+}$ that was reduced to Ni$^2$ in the presence of GA, i.e., LiOH+GA. In this case, H$_2$O serves as a weak reducing agent to reduce Ni$^{3+}$ into Ni$^{2+}$ In contrast, all the Ni$^{3+}$ was reduced to Ni$^{2+}$ via LTHR process in the presence of GA, suggesting dramatically improved relithiation kinetics. Similar results were observed for D-NCM111, where relithiation in the GA-containing LiOH solution was more effective than LiOH without GA. Specifically, 24.68% of Ni$^{2+}$ was converted to Ni$^{3+}$ due to chemical delithiation. After LTHR treatment without GA, there were still 22.79% Ni remaining at Ni$^{3+}$, which meant only 1.89% of Ni$^{3+}$ was spontaneously reduced back to Ni$^{2+}$ at low temperature. These results confirm the importance of GA in facilitating the reduction of Ni$^{3+}$ to Ni$^{2+}$, which further promotes the insertion of Li+ from the solution back into the Li-deficient sites in the NCM cathodes to compensate the charge.

Figure 7A:
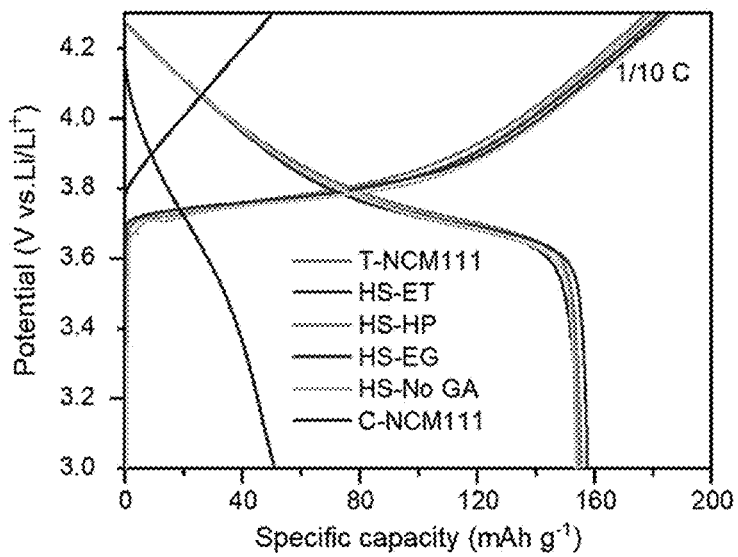
FIGS. 7A-7H illustrate the electrochemical performance of the HS-C-NCM111 and HS-C-NCM622, where
Figure 7B:
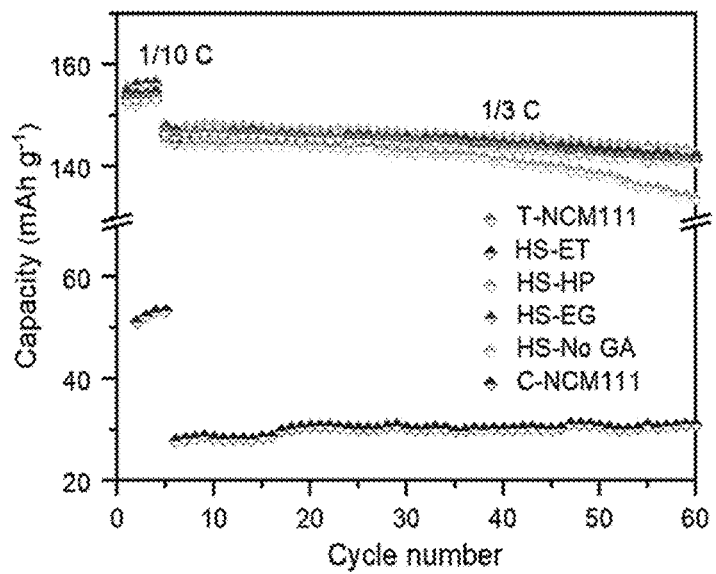

The electrochemical performance of C-NCM111 regenerated with the LTHR process followed by short anneal at 850° C. (denoted as "HS-C-NCM111") was evaluated via half-cell test. FIGS. 7A-7B plot the voltage profiles and cycling stability for the various materials and processing conditions. The C-NCM111 exhibited an initial capacity of 51 mAh g$^{-1}$ due to significant Li loss (38%) and crystal structure degradation. As the effective ionic radii of Ni$^{3+}$ is smaller than Ni$^{2+}$, Ni$^{3+}$ more easily occupies the Li sites when Li is in deficiency state and the cation mixing ratio increases accordingly. High cation mixing ratio will block the Li$^+$ transport, which reduces and Li$^+$ storage capacity and rate performance. After regeneration, the regenerated samples and the pristine sample exhibited a similar initial discharge capacity of ~155 mAh g$^{-1}$ at C/10 in Gen2 electrolyte. The C-NCM111 treated without GA only showed 92% capacity retention at C/3 after 60 cycles. By comparison, the regenerated NCM111 with different GAs from the LTHR process all held a similar capacity retention of ~96% at C/3 after 60 cycles, which shows the same cycling stability as the pristine T-NCM111. A similar trend was also observed in the D-NCM111 samples with LP40 in half-cells.

Figure 7C:
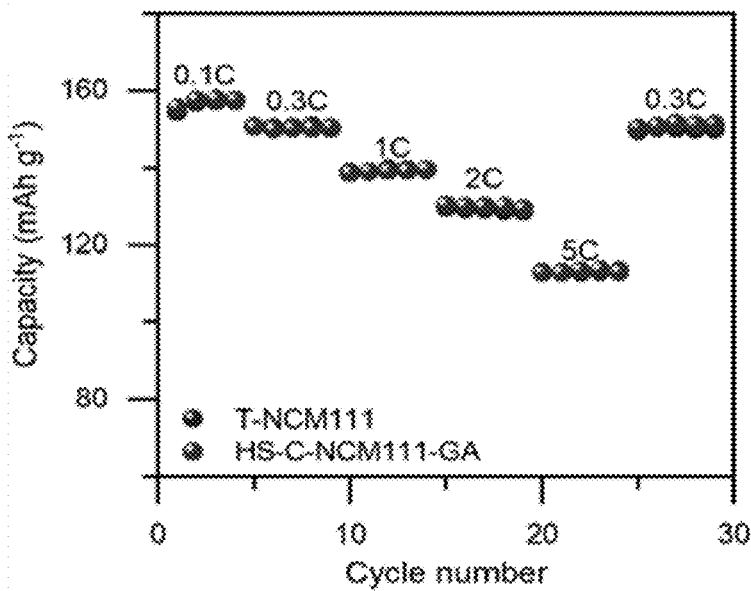
Figure 7D:
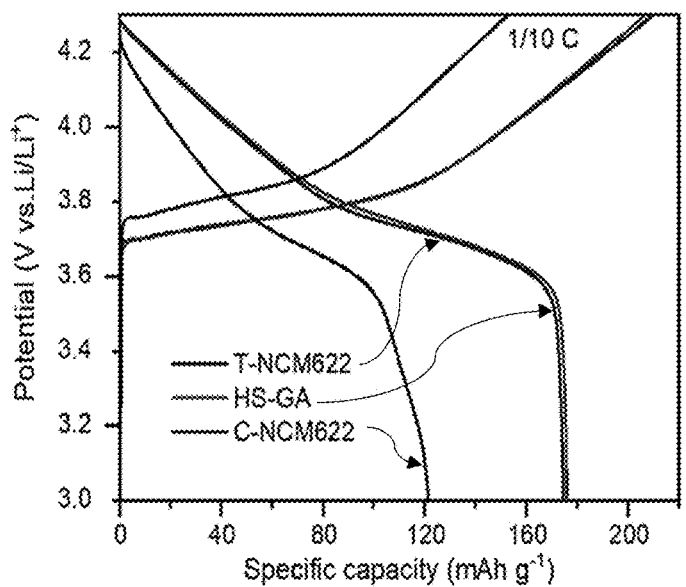
Figure 7E:
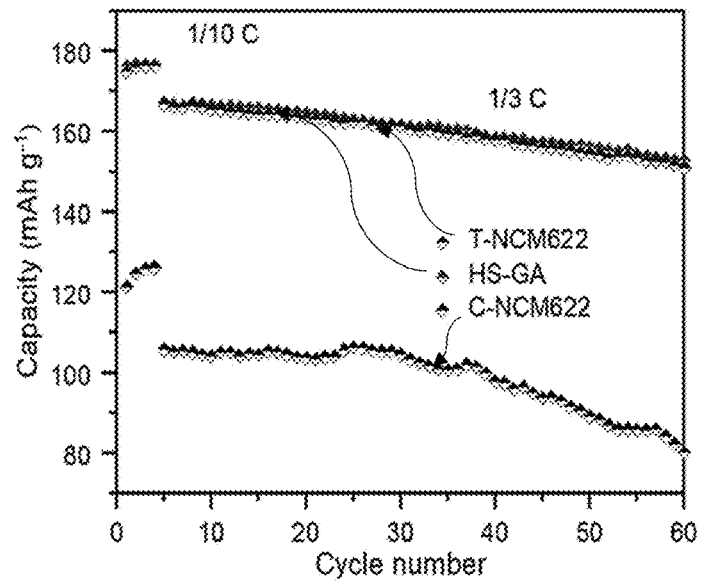
Figure 7F:
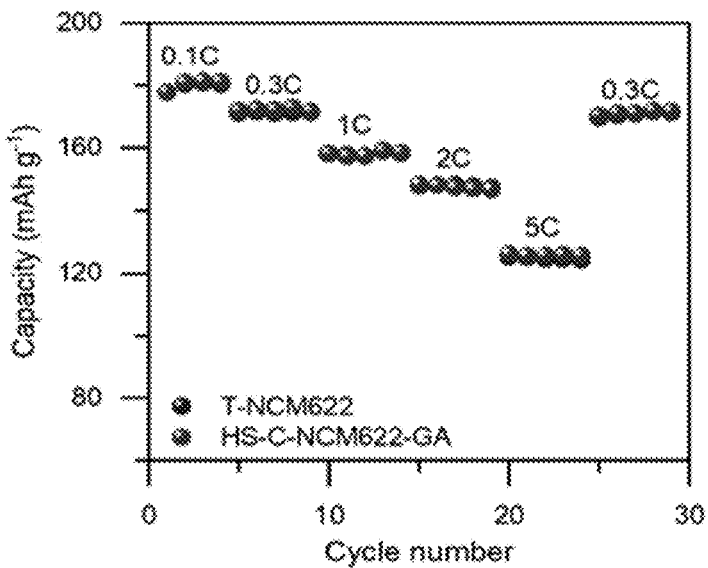
Figure 7G:
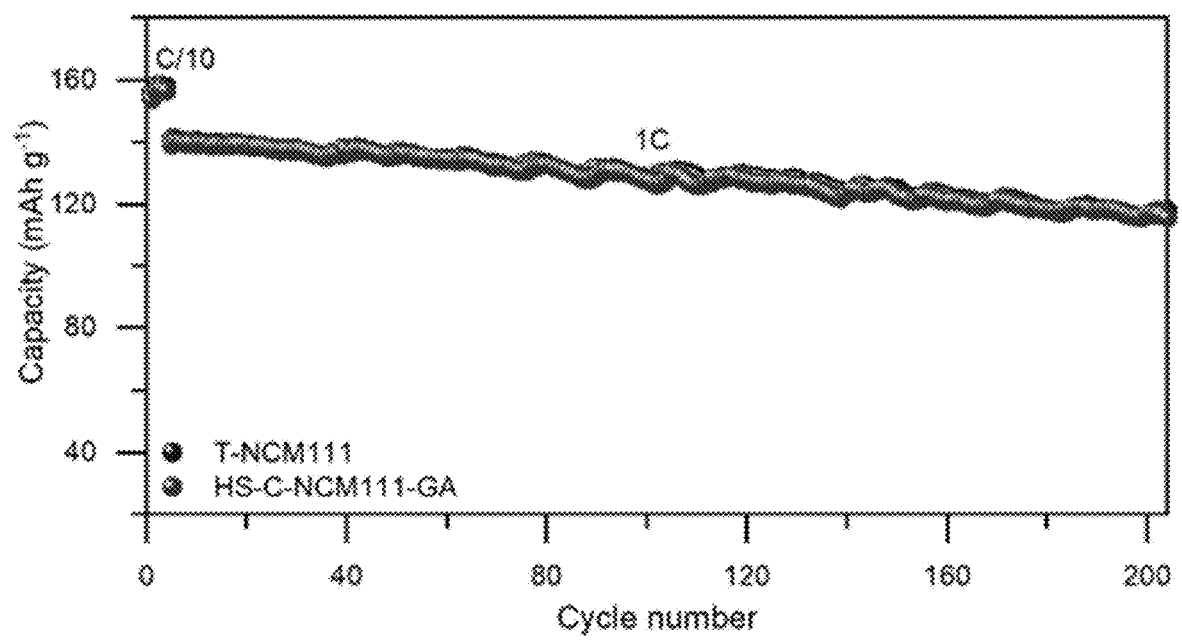
Figure 9A:
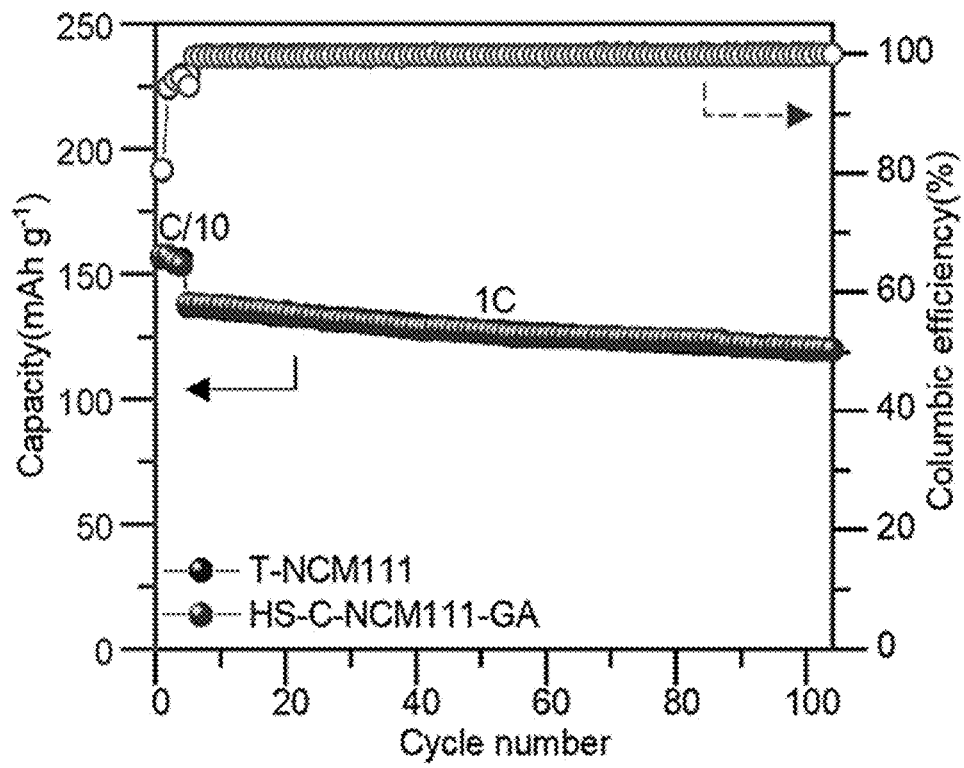
FIGS. 9A-9B illustrate the full cell cycling stability of regenerated HS-C-NCM111 and HS-C-NCM622, respectively, using EG as the reducing agent.

The D-NCM111 exhibited an initial capacity of 134.0 mAh g$^{-1}$ at C/10 and held a capacity retention of 78% at C/3 after 50 cycles. After LTHR followed by short annealing, the initial capacity of HS-D-NCM111 reached 154 mAh g$^{-1}$ at C/10 and the capacity retention was improved to 91% at C/3 after 50 cycles, which is on par with the pristine T-NCM111. Half-cell tests were evaluated under a high loading of 10 mg/cm$^2$. Under this condition, the cycling performance was limited by the poor stability of lithium metal anode. We evaluated rate performance and half-cell performance (at 1C for 200 cycles) of HS-C-NCM111-GA (with EG) with a cathode loading of 3 mg/cm$^2$ (FIG. 7C, 7G). The HS-C-NCM111-GA delivered a capacity of 141 mAh g$^{-1}$ at 1 C with 83% capacity retention after 200 cycles, similar to that of the pristine T-NCM111. The HS-C-NCM111-GA delivered a capacity of 157 mAh g$^{-1}$, 151 mAh g$^{-1}$, 140 mAh g$^{-1}$, 130 mAh g$^{-1}$, 113 mAh g$^{-1}$ at 0.1 C, 0.3 C, 1 C, 3 C, 5 C, respectively. The capacity of the pristine T-NCM111 reached 156 mAh g$^{-1}$, 151 mAh g$^{-1}$, 140 mAh g$^{-1}$, 129 mAh g$^{-1}$, 113 mAh g$^{-1}$ at 0.1 C, 0.3 C, 1 C, 3 C, 5 C, respectively. These results indicated the rate capability of regenerated NCM111 had been recovered. Full-cell testing of HS-C-NCM111-GA (cathode loading: 10 mg/cm$^2$) paired with graphite anode was also performed. As shown in FIG. 9A, the HS-C-NCM111-GA exhibited an initial capacity of 138 mAh g$^{-1}$ at 1 C and maintained capacity of 120 mAh g$^{-1}$ after 100 cycles in the full cell test, which is comparable with that of the pristine T-NCM111 under the same condition. The HS-C-NCM111-GA could achieve the same electrochemical performances as those of T-NCM111 in the rate, half-cell, and full-cell test, which confirmed the success of the inventive regeneration method.

Figure 8A:
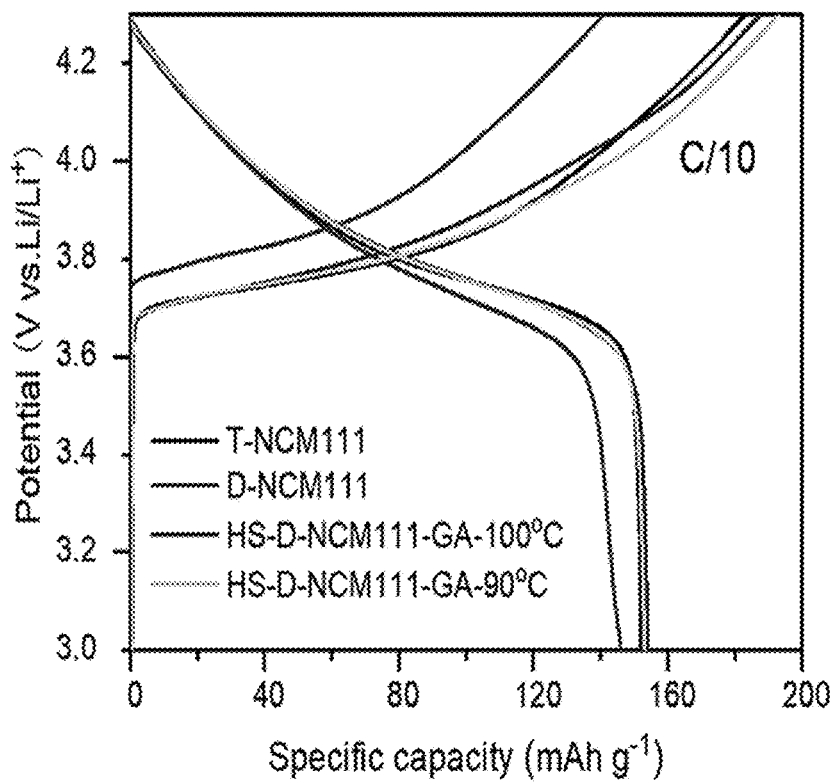
FIGS. 8A and 8B plot voltage profiles and cycling stability performance, respectively, of NCM111 regenerated at 90° and 100° C., as well as control samples (T-NCM111 and D-NCM111).
Figure 8B:
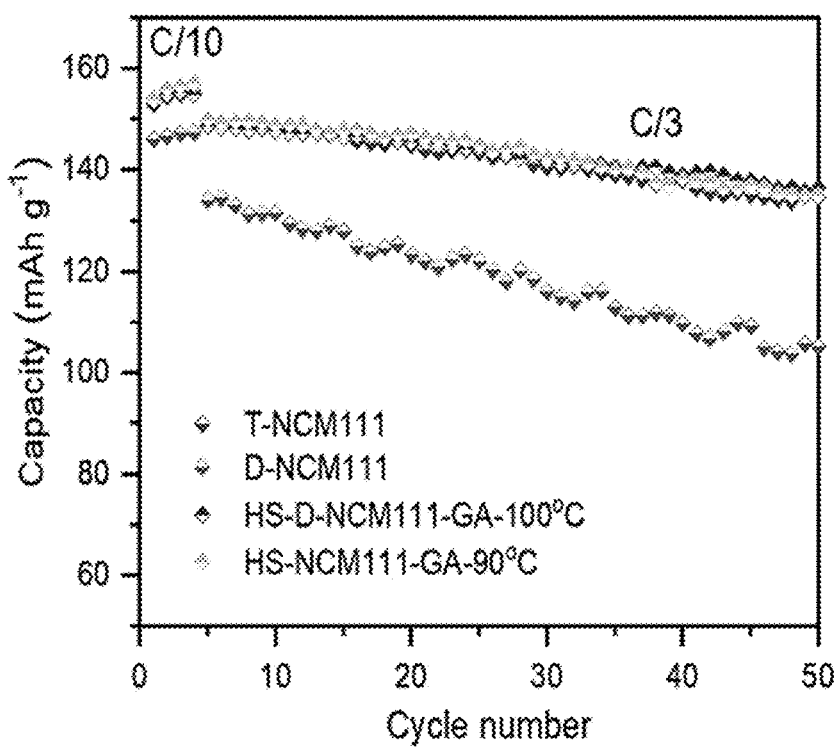

In addition, the delithiated NCM111 regenerated with the LTHR process at 90° C. and 100° C. followed by short annealing was denoted as "HS-D-NCM111-GA-90° C." and "HS-D-NCM111-GA-100° C." in FIGS. 8A and 8B. The initial capacities of HS-D-NCM111-GA-90° C. reached 154.0 mAh g$^{-1}$ at C/10, achieving the same level of capacity for pristine NCM111. Furthermore, the HS-D-NCM111-GA-90° C. delivered initial capacities of 149.8 mAh g at C/3 and the capacity retention can reach 91% after 50 cycles, which is on par with the pristine level (T-NCM111). This result indicates that the samples were effectively recovered after hydrothermal treatment at 100° C. or even lower temperature followed by annealing.

In view of the growing interest in high Ni NCM cathodes, testing was extended to NCM622 by comparing the electrochemical properties between the cycled (C-NCM622), LTHR regenerated (denoted as HS-C-NCM622) and the pristine samples using Gen2 electrolyte (FIGS. 7D-7F, 7H). As noted previously, while the three GAs all worked well to regenerate NMC111, EG was deemed most suitable for practical application due to its low cost and safety benefits. Accordingly, for extended testing of NCM622, EG was employed as the reducing agent for the LTHR process.

Figure 7H:
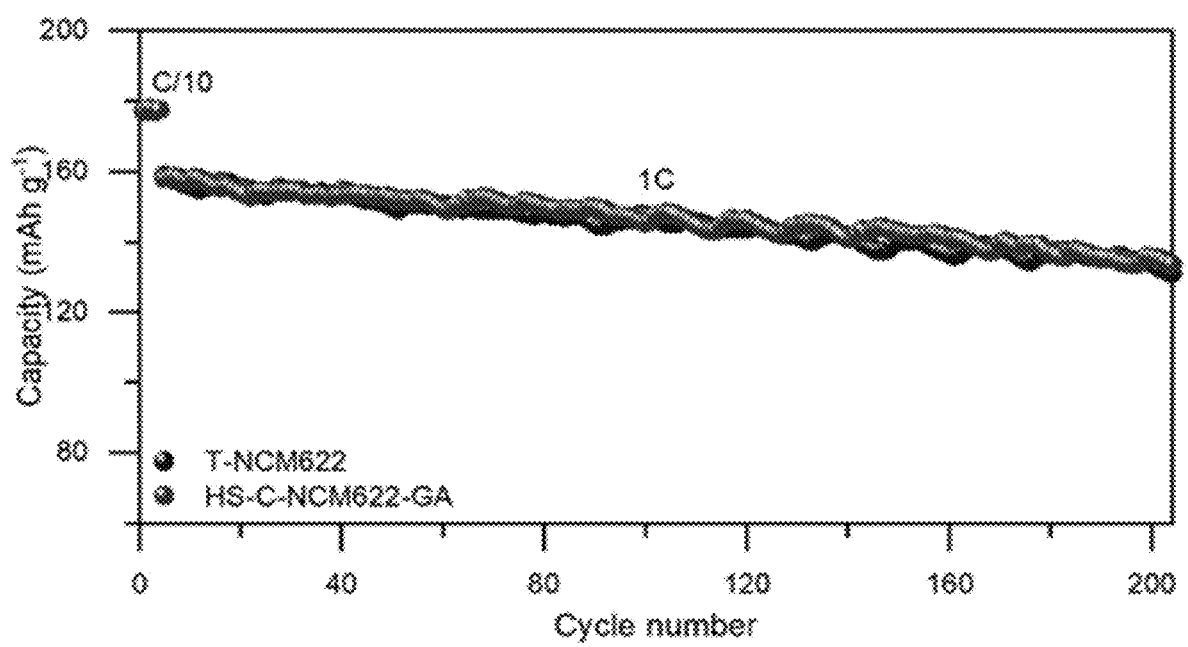
Figure 9B:
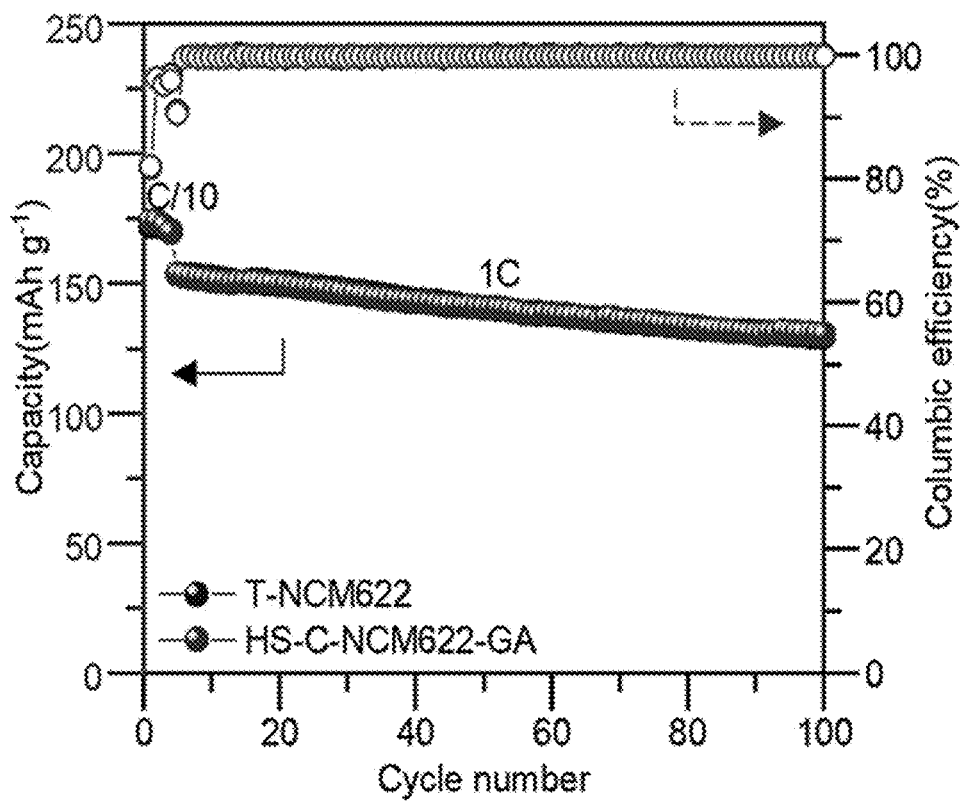

The C-NCM622 exhibited an initial capacity of 121 mAh g$^{-1}$ at C/10 and showed a capacity retention of 76% at C/3 after 60 cycles. With the LTHR process and short annealing, the initial capacity of HS-C-NCM622 reached 175 mAh g$^{-1}$ at C/10 and the capacity retention was improved to 92% at C/3 after 60 cycles, which is equal to the pristine T-NCM622. To demonstrate the electrochemical performance of the regenerated NCM622, we evaluated the rate performance and cycling stability in half-cells (at 1C for 200 cycles) of HS-C-NCM622-GA (regenerated with EG as GA) with a cathode loading of 3 mg/cm² (FIGS. 7F, 7H). The HS-C-NCM622-GA delivered similar rate capability and long cycling stability as that of T-NCM622. In a full-cell test of HS-C-NCM622-GA (cathode loading: 10 mg/cm²) paired with graphite anode (FIG. 9B). The HS-C-NCM622-GA showed a capacity of 154 mAh g$^{-1}$ at 1 C in the first cycle and maintained capacity of 130 mAh g$^{-1}$ after 100 cycles at 1C in the full-cell test, which is close to that of the pristine T-NCM111 under the same condition. In summary, the HS-C-NCM622-GA could achieve the same electrochemical performances as those of T-NCM622 in the rate, half-cell, and full-cell test, thus confirming the success of NCM622 regeneration. The successful regeneration of both NCM111 and NCM622 using different GAs suggests the high efficiency and versatility of the inventive LTHR-based direct recycling approach. In general, these results support the use of a reductive environment to lower the activation barrier for Ni$^{3+}$ reduction and relithiation.

Figure 10A:
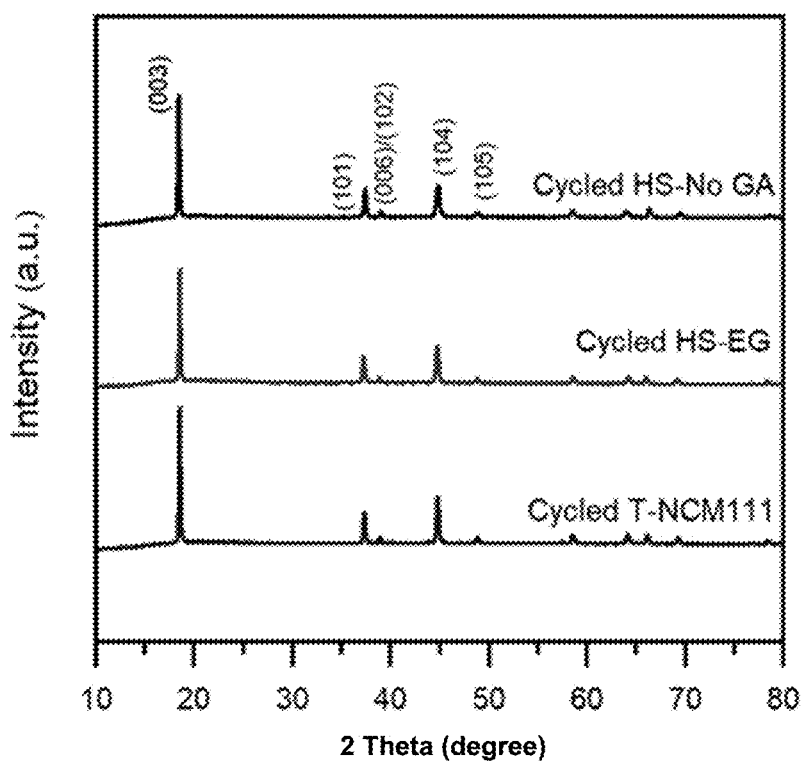
FIGS. 10A-10B show XRD patterns of cycled samples T-NCM111, HS-EG and HS-No GA at scan ranges of 10-80° and 18-19°, respectively.
Figure 10B:
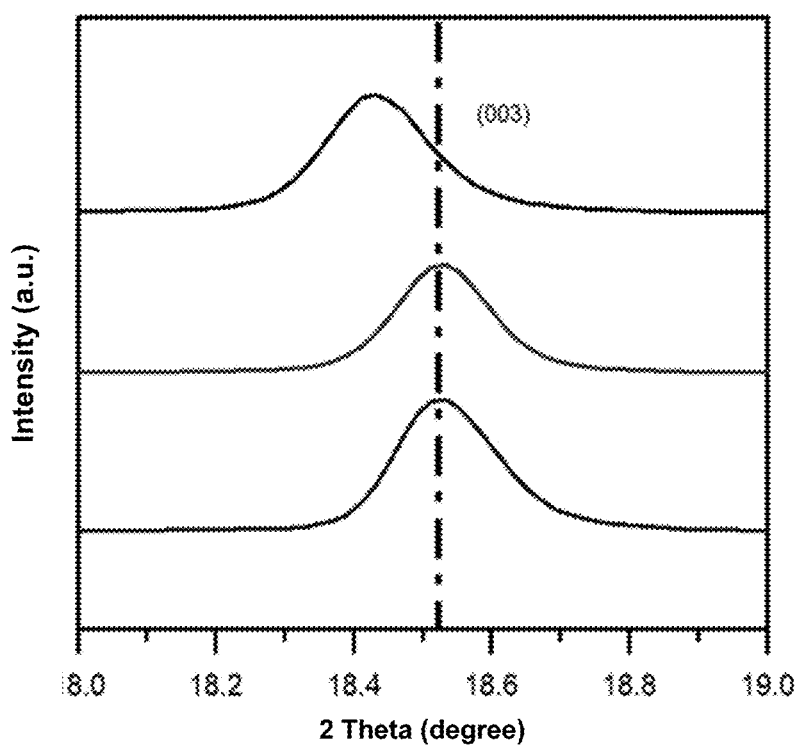

To examine the difference in structural stability between regenerated materials and pristine materials, HS-EG, HS-No GA and T-NCM111 electrodes after cycles (denoted as "Cycled HS-EG", "Cycled HS-No GA" and "Cycled T-NCM111" respectively) were characterized by XRD (FIGS. 10A-10B). The XRD diffraction peaks of these samples still matched well with the typical layered structure without major impurity phase, indicating that the bulk structure of the pristine and regenerated NCM111 was not affected by electrochemical cycling. No obvious differences in terms of structure were observed between Cycled HS-EG and Cycled T-NCM111, which also demonstrated the viability of the LTHR-based direct regeneration process. However, as discussed earlier, without GA addition, Li content, Li/Ni mixing ratio, transition metal valence, electrochemical stability, etc. of regenerated materials cannot perfectly recover to the original condition. After cycling, the (003) peak of Cycled HS-No GA shift to a lower degree compared with Cycled HS-EG and Cycled T-NCM111, due to more severe Li deficiency as well as more significant lattice expansion along the c-axis. Overall, this redemonstrates that GA is conducive to regenerating NCM111 in the LTHR process to maintain the structural stability and proves the recovery effect to some extent.

In conventional hydrothermal relithiation processes, NCM materials require high-pressure reactors (generally autoclaves) to maintain the pressure at greater than 25 bar (saturation pressure of water) at 220° C. (see FIG. 1C). The facilitated relithiation kinetics enabled by GAs using the inventive approach, the LTHR can be conducted at temperatures equal to or below the boiling point of water, allowing the relithiation process to be conducted at ambient pressure, removing the need for high-pressure reactors. Specifically, when the relithiation temperature is reduced to 100° C., the pressure required for the inventive LTHR process can be reduced to around 1 bar. By replacing the traditional high-pressure reactors with low cost vessels, large scale direct regeneration becomes more viable for industry application without additional safety precautions required for the previous processes.

Figure 11A:
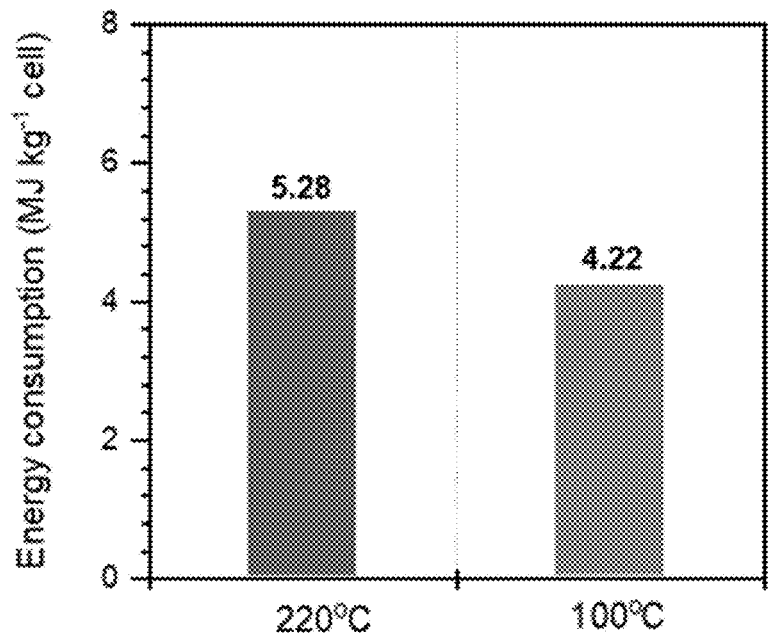
FIGS. 11A-11B compare energy consumption and GHG emissions, respectively, for direct recycling methods based on different processing temperatures.
Figure 11B:
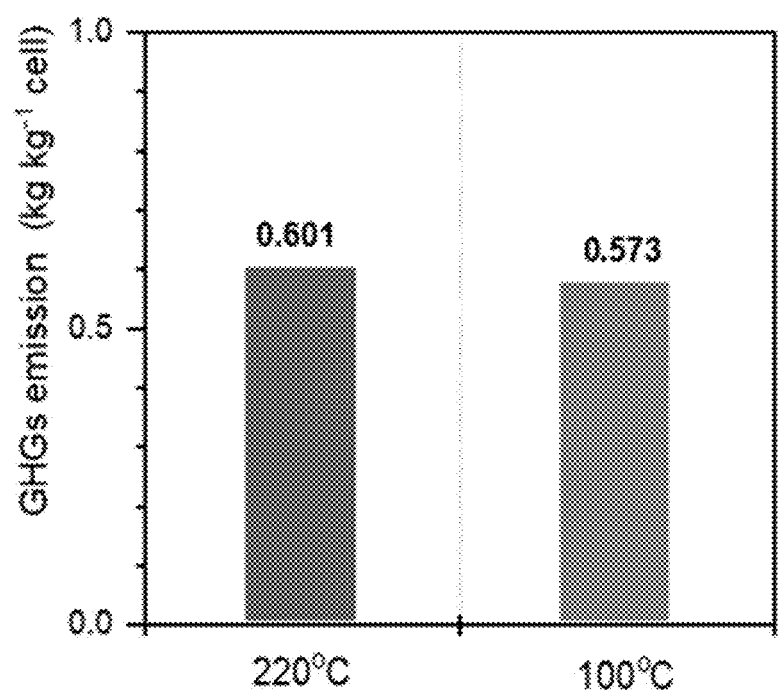

An evaluation of the environmental and economic impact of the LTHR-based direct regeneration was conducted using the EverBatt model developed by Argonne National Laboratory using a throughput of 10,000 tons of spent LIBs per year. The life-cycle analysis (LCA) of the entire direct recycling process with LTHR and the traditional high-pressure reaction were performed in terms of energy consumption (FIG. 11A), greenhouse gas (GHG) emission (FIG. 11B), operation cost, and overall profit. By assuming the same pre-treatment and post-separation, the modeling results show that the total energy consumption was reduced from 5.28 MJ kg$^{-1}$ of spent cells for traditional high-pressure regeneration reaction to only 4.22 MJ kg$^{-1}$ of spent cells for LTHR (FIG. 5, panel a). Consistently, the use of LTHR for direct regeneration process can also reduce around 0.03 kg of GHG emission per kg cell compared to the traditional high-pressure regeneration reaction at 220° C.

Due to the reduced temperature of the relithiation process, low-grade industry waste heat can be potentially utilized to offer heat to the LTHR process. The total process cost of the direct recycling of NCM batteries was estimated to be $2.07 and $2.25 of spent battery cells processed at 100° C. and 220° C., respectively. Thus, the regenerated cathode production using LTHR promises to offer additional $0.18 profit per kg of spent cells. In addition, significant cost savings can be achieved due to reduced safety requirements.

Figure 12:
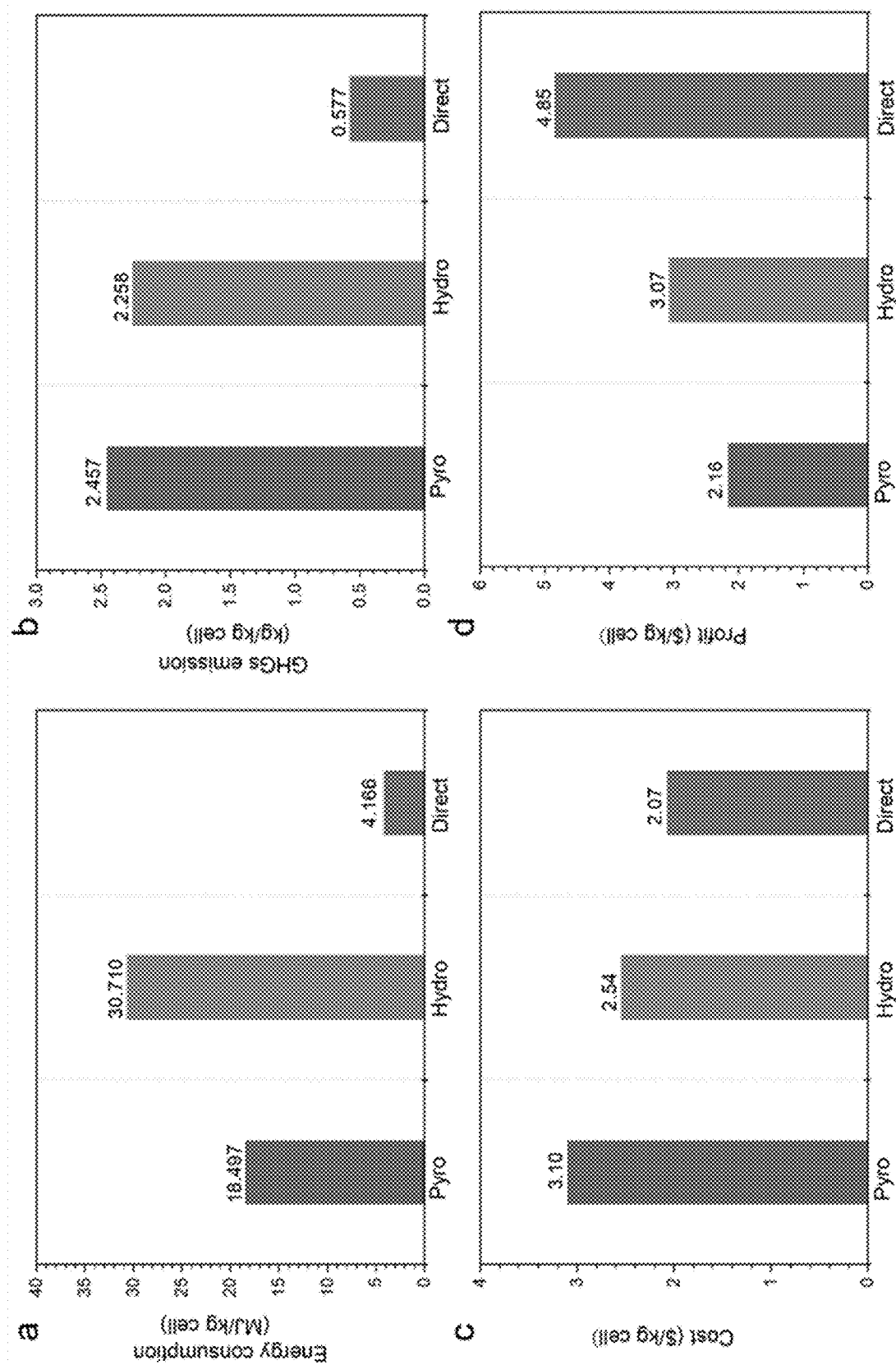
FIG. 12 compares energy consumption, GHG emissions, cost, and profit for pyrometallurgical ("Pyro"), hydrometallurgical ("Hydro"), and the inventive LTHR-based direct ("Direct") recycling methods for NCM111.

The inventive LTHR-based direct recycling method for NCMs recycling was also compared against traditional pyrometallurgical recycling and hydrometallurgical recycling process with LCA. FIG. 12 provides the results of this comparison. The energy consumption for pyrometallurgical and hydrometallurgical recycling process of spent NCM cells are 18.497 MJ kg$^{-1}$ and 30.710 MJ kg$^{-1}$ respectively, which are significantly higher than the LTHR-based direct recycling process of only 4.166 MJ kg$^{-1}$ (panel a). As shown in panel b, for 1 kg spent NCM cells, pyrometallurgy (2.457 kg) and hydrometallurgy (2.258 kg) released notably higher GHG than that of direct recycling method (0.577 kg). These can be explained by the high temperature smelting in the pyrometallurgical process and production of extensive chemicals used in hydrometallurgical recycling process. In addition, cost and profits related to three recycling processes are also modeled and analyzed shown in panels c and d of FIG. 12. The total costs for pyrometallurgical, hydrometallurgical and LTHR-based direct recycling of 1 kg spent NCM cells are $3.10, $2.54, and $2.04 respectively. This is due to the expensive equipment, extensive usage of chemicals and high energy consumption of pyrometallurgical recycling and hydrometallurgical recycling process. As Ni and Co are valuable, profits of $2.16 and $3.07 through pyrometallurgical and hydrometallurgical recycling of 1 kg spent NCM cells can still be earned respectively. As the result of the significant reductions in total energy use, GHG emissions, and processing cost, the inventive LTHR-based direct regeneration method is a preferable option for closed-loop, safe LIB recycling. In general, the LTHR-based direct recycling method satisfies each element of the "4H" approach for batteries recycling: high efficiency, high economic return, high environmental benefit and high safety, representing a new trend in sustainable LIB recycling.

The invention claimed is:

1. A method for regenerating spent lithium-ion battery cathode material, wherein the cathode material is in a powdered form, the method comprising:
   processing the cathode material in an aqueous lithium (Li) solution and a reducing agent at a temperature within a range of 80° to 100° C. for a processing period sufficient to relithiate the cathode material;
   washing and drying the processed cathode material; and
   annealing the dried processed cathode material in oxygen at an annealing temperature for an annealing period to produce a regenerated cathode material.

2. The method of claim 1, wherein the Li solution comprises LiOH.

3. The method of claim 1, wherein the cathode material is processed at about 1 bar.

4. The method of claim 1, wherein the reducing agent is one or a combination of ethanol (ET), ethylene glycol (EG), hydrogen peroxide (HP), glycerol, citric acid, and L-ascorbic acid.

5. The method of claim 1, wherein the processing period is from 2 to 20 hours.

6. The method of claim 5, wherein the processing period is about 8 hours at 100° C.

7. The method of claim 1, wherein the annealing temperature is within a range of 600° C. to 1000° C. and the annealing period is from 1 to 10 hours.

8. The method of claim 7, wherein the annealing temperature is 850° C. and the annealing period is four hours.

9. The method of claim 1, wherein the cathode material is $LiNi_xCo_yMn_zO_2$, where 0<x, y, z<1, x+y+z=1 ("NCM").

10. The method of claim 9, wherein the NCM is $LiNi_{0.33}Co_{0.33}Mn_{0.33}O_2$ (NCM111).

11. The method of claim 9, wherein the NCM is $LiNi_{0.6}Co_{0.2}Mn_{0.2}O_2$ (NCM622).

12. The method of claim 1, wherein the aqueous Li solution comprises 0.1 to 4 M LiOH with 1-3% (v/v) of the reducing agent.

13. The method of claim 1, further comprising, before annealing, mixing 5 mol % of excessive $Li_2CO_3$ with the processed cathode material.

14. A method for treating lithium-ion battery cathode material from a spent battery cell, comprising:
   separating cathode strips comprising cathode strip substrates from the battery cell;
   treating the cathode strips in one or more solvent solutions to remove NCM powder, binder and carbon black from the cathode strip substrates;
   extracting the NCM powder;
   processing the NCM powder in an aqueous lithium (Li) solution and a reducing agent at a temperature within a range of 80° to 100° C. for a processing period sufficient to produce a relithiated NCM powder;
   washing and drying the relithiated NCM powder; and
   annealing the dried powder in oxygen at an annealing temperature for an annealing period to produce a cathode powder with restored composition, crystal structure and electrochemical performance.

15. The method of claim 14, further comprising, before annealing, mixing 5 mol % of excessive $Li_2CO_3$ with the relithiated powder.

16. The method of claim 14, wherein the Li solution comprises LiOH.

17. The method of claim 14, wherein the NCM powder is processed at about 1 bar.

18. The method of claim 14, wherein the green reducing additive is one or a combination of ethanol (ET), ethylene glycol (EG) hydrogen peroxide (HP), glycerol, citric acid, and L-ascorbic acid.

19. The method of claim 14, wherein the processing period is from 2 to 20 hours.

20. The method of claim 19, wherein the processing period is 8 hours at 100° C.

21. The method of claim 14, wherein the annealing temperature is within a range of 600° C. to 1000° C. and the annealing period is from 1 to 10 hours.

22. The method of claim 21, wherein the annealing temperature is 850° C. and the annealing period is four hours.

23. The method of claim 14, wherein the NCM powder is $LiNi_xCo_yMn_zO_2$, where 0<x, y, z<1, x+y+z=1 ("NCM").

24. The method of claim 23, wherein the NCM powder is $LiNi_{0.33}Co_{0.33}Mn_{0.33}O_2$ (NCM111).

25. The method of claim 23, wherein the NCM powder is $LiNi_{0.6}Co_{0.2}Mn_{0.2}O_2$ (NCM622).

26. The method of claim 14, wherein the aqueous Li solution comprises 0.1 to 4 M LiOH with 1-3% (v/v) of the reducing agent.

* * * * *